(12) United States Patent
Tajima et al.

(10) Patent No.: US 11,742,978 B2
(45) Date of Patent: Aug. 29, 2023

(54) OPTICAL NETWORK DEVICE AND METHOD FOR MONITORING TRANSMISSION LINE

(71) Applicant: FUJITSU LIMITED, Kawasaki (JP)

(72) Inventors: Kazuyuki Tajima, Yokosuka (JP); Takahito Tanimura, Yokohama (JP); Setsuo Yoshida, Inagi (JP); Eri Katayama, Fukuoka (JP); Kiichi Sugitani, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 17/554,096

(22) Filed: Dec. 17, 2021

(65) Prior Publication Data

US 2022/0209884 A1    Jun. 30, 2022

(30) Foreign Application Priority Data

Dec. 25, 2020 (JP) .................................. 2020-216284
Nov. 15, 2021 (JP) .................................. 2021-185433

(51) Int. Cl.
*H04B 10/25* (2013.01)
*H04J 14/06* (2006.01)
*H04B 10/2513* (2013.01)
*H04B 10/2507* (2013.01)

(52) U.S. Cl.
CPC .......... *H04J 14/06* (2013.01); *H04B 10/2513* (2013.01); *H04B 10/2572* (2013.01)

(58) Field of Classification Search
CPC ............................. H04J 14/06; H04B 10/2572
See application file for complete search history.

(56) References Cited

U.S. PATENT DOCUMENTS

| 2002/0149823 A1* | 10/2002 | Bergano ............. H04B 10/2569 398/20 |
| 2013/0188948 A1 | 7/2013 | Dou et al. |
| 2021/0092498 A1* | 3/2021 | Tajima ............... H04Q 11/0071 |

FOREIGN PATENT DOCUMENTS

| JP | 2013-74625 A | 4/2013 |
| JP | 2020-88628 A | 6/2020 |
| JP | 2014-134161 | * 8/2020 ......... H04B 10/2572 |

* cited by examiner

*Primary Examiner* — Nathan M Cors
(74) *Attorney, Agent, or Firm* — STAAS & HALSEY LLP

(57) ABSTRACT

An optical network device includes a receiver that receives a polarization multiplexed optical signal and a processor. The processor separates an electric field information signal indicating the polarization multiplexed optical signal into first and second polarization components orthogonal to each other, generates third and fourth polarization components by controlling the first and second polarization components, calculates an evaluation value corresponding to a power of the third or fourth polarization component for each of a plurality of positions on a transmission line, calculates a variation in the evaluation value for a control amount for each of the plurality of positions, and decides whether a first position is a position to be detected based on a result of comparing a variation in an evaluation value for the first position with a variation in an evaluation value for a second position adjacent to the first position.

16 Claims, 35 Drawing Sheets

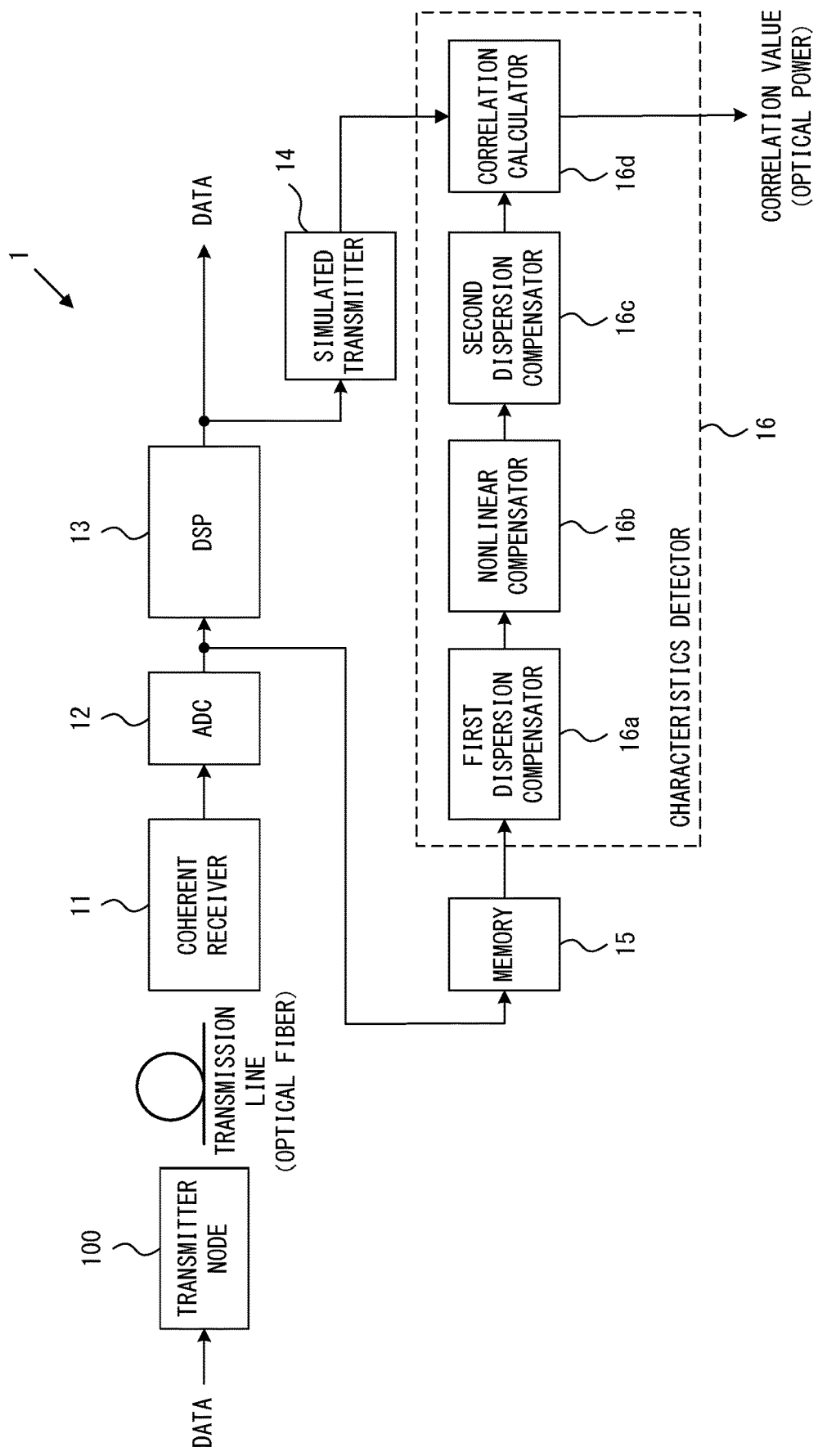
F I G. 1

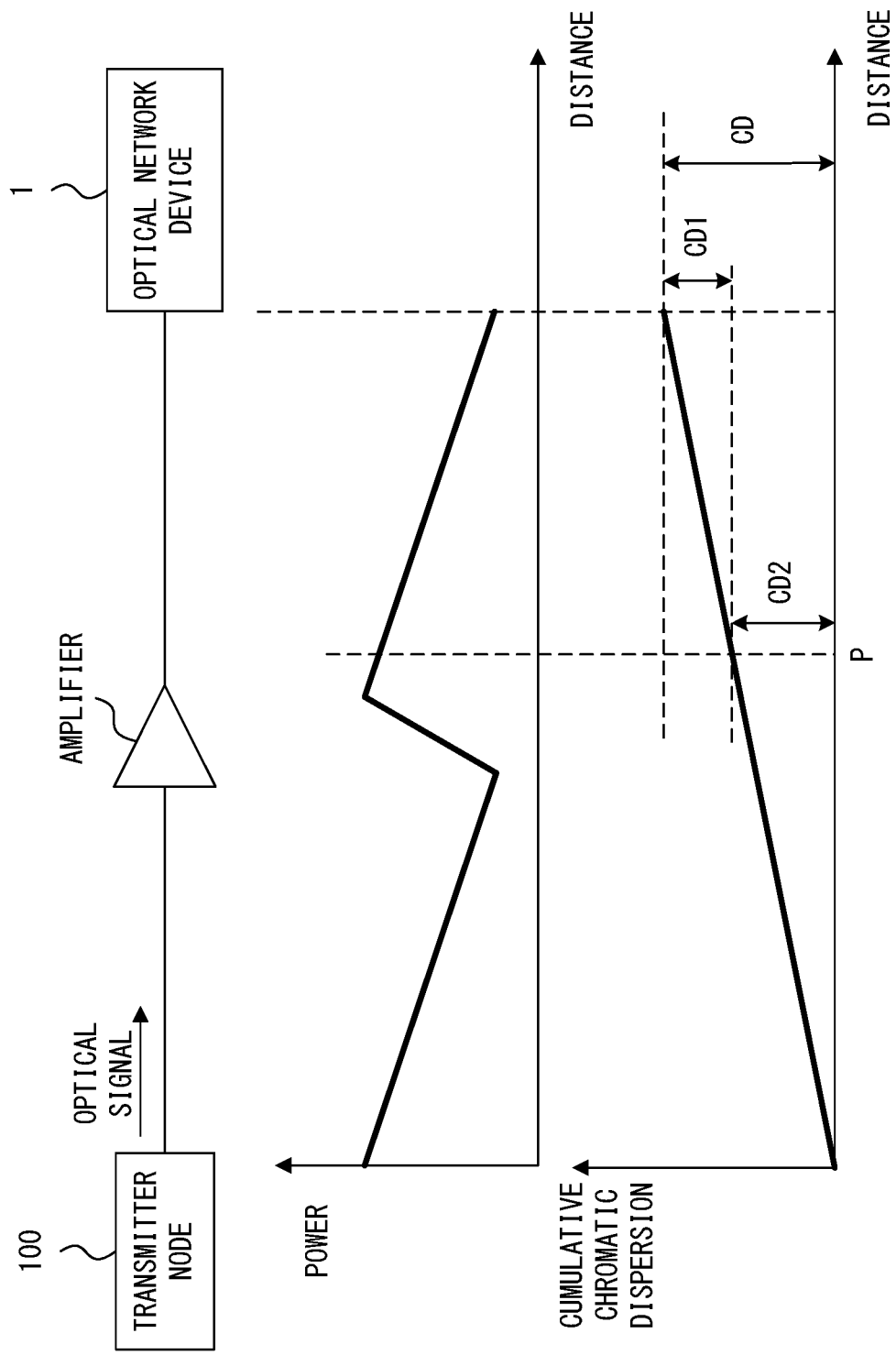
F I G. 3

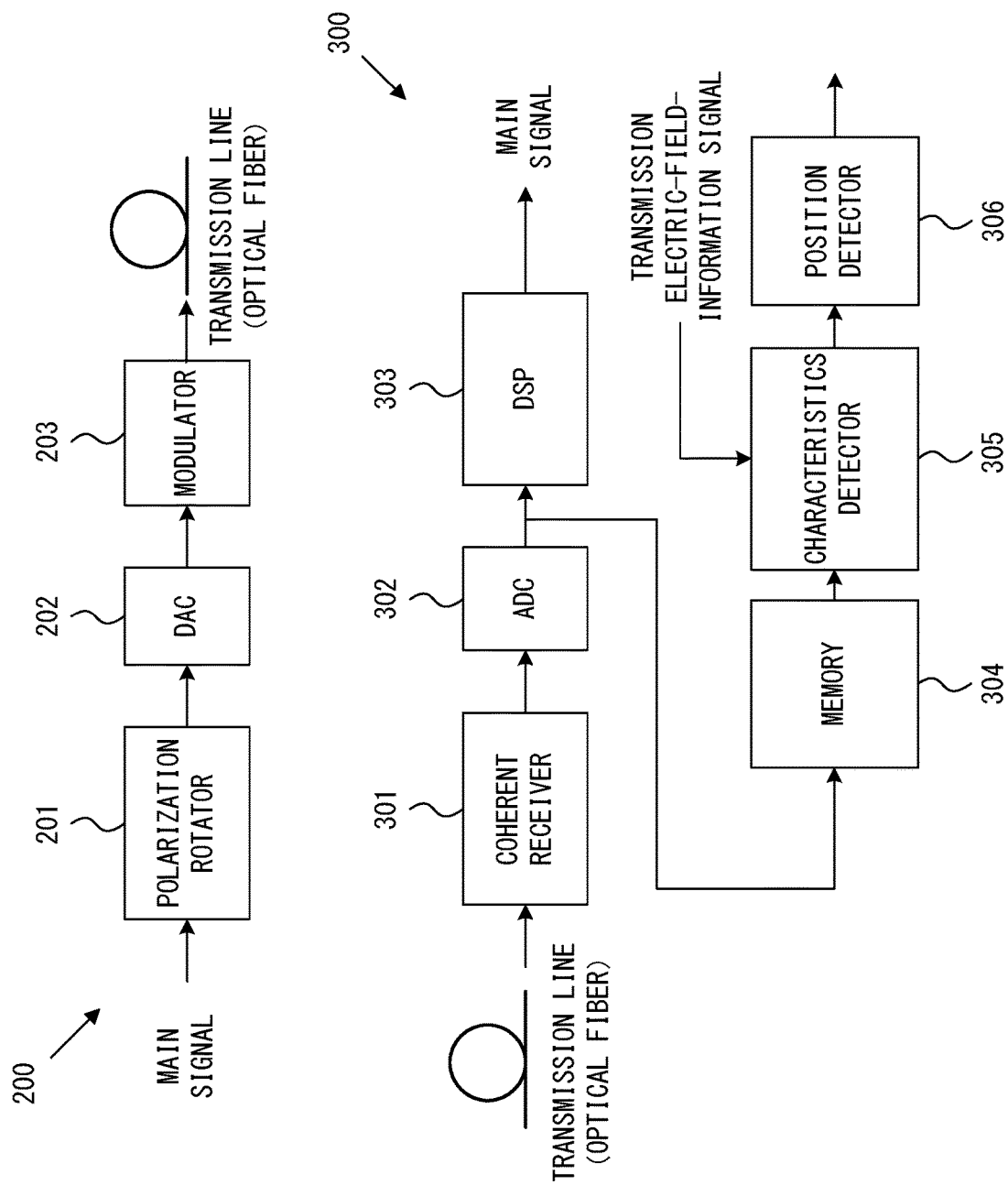
F I G. 5

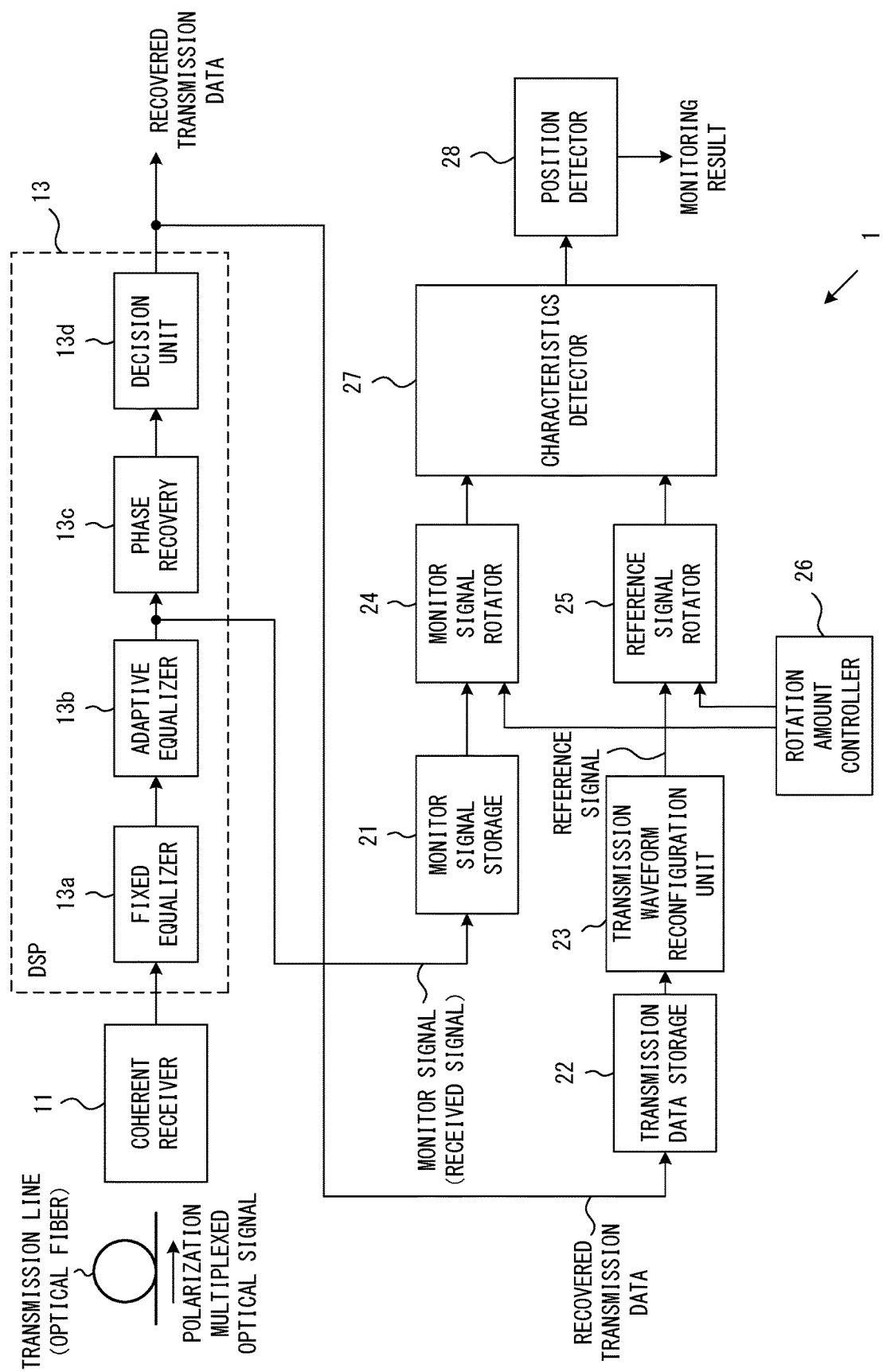
F I G. 9

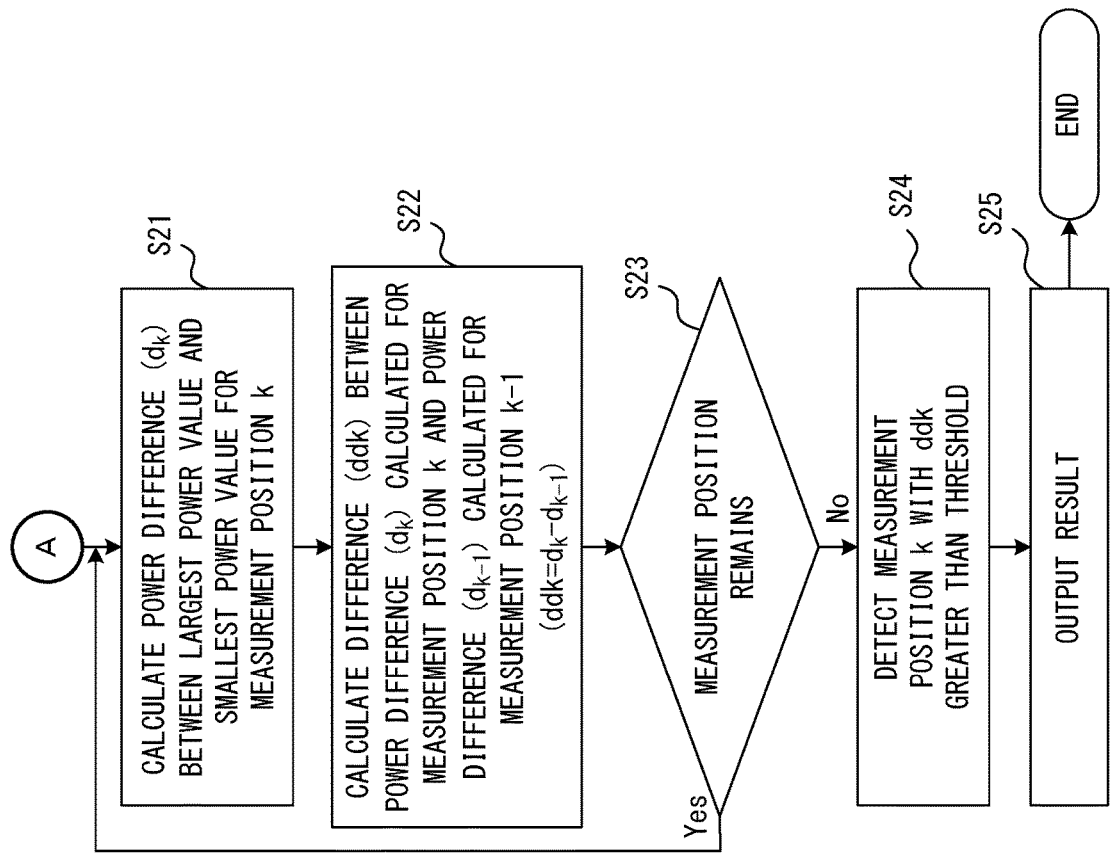
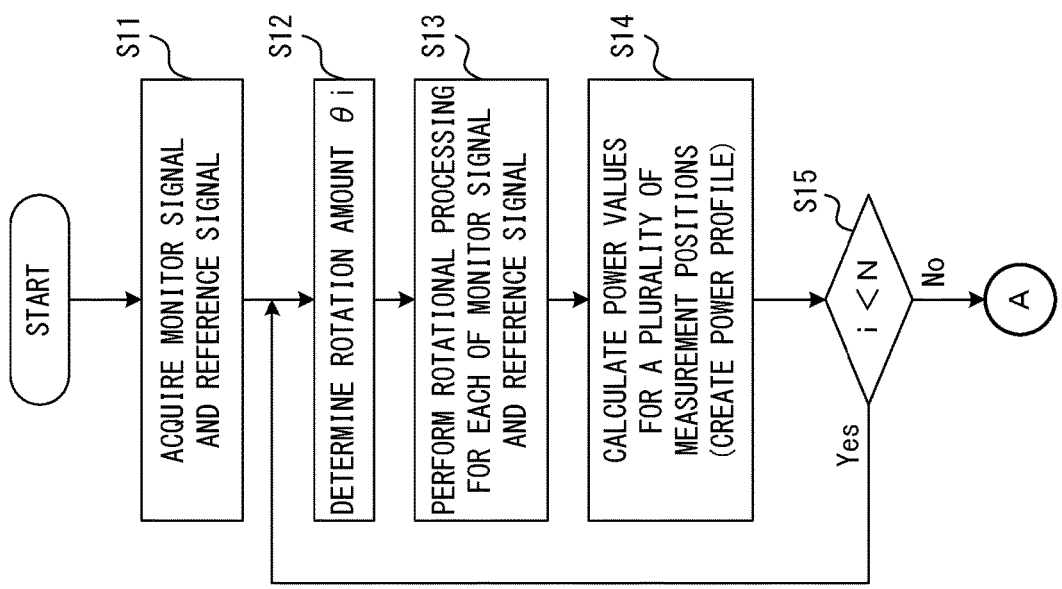
FIG. 12

| MEASUREMENT POSITION | X0 | X1 | X2 | X3 | X4 | X5 |
|---|---|---|---|---|---|---|
| CHROMATIC DISPERSION : CD1 | 100 | 80 | 60 | 40 | 20 | 0 |
| CHROMATIC DISPERSION : CD2 | 0 | 20 | 40 | 60 | 80 | 100 |
| ROTATION AMOUNT : $\theta 0$ | C00 | C10 | C20 | C30 | C40 | C50 |
| ROTATION AMOUNT : $\theta 1$ | C01 | C11 | C21 | C31 | C41 | C51 |
| ROTATION AMOUNT : $\theta 2$ | C02 | C12 | C22 | C32 | C42 | C52 |
| ROTATION AMOUNT : $\theta 3$ | C03 | C13 | C23 | C33 | C43 | C53 |
| ROTATION AMOUNT : $\theta 4$ | C04 | C14 | C24 | C34 | C44 | C54 |

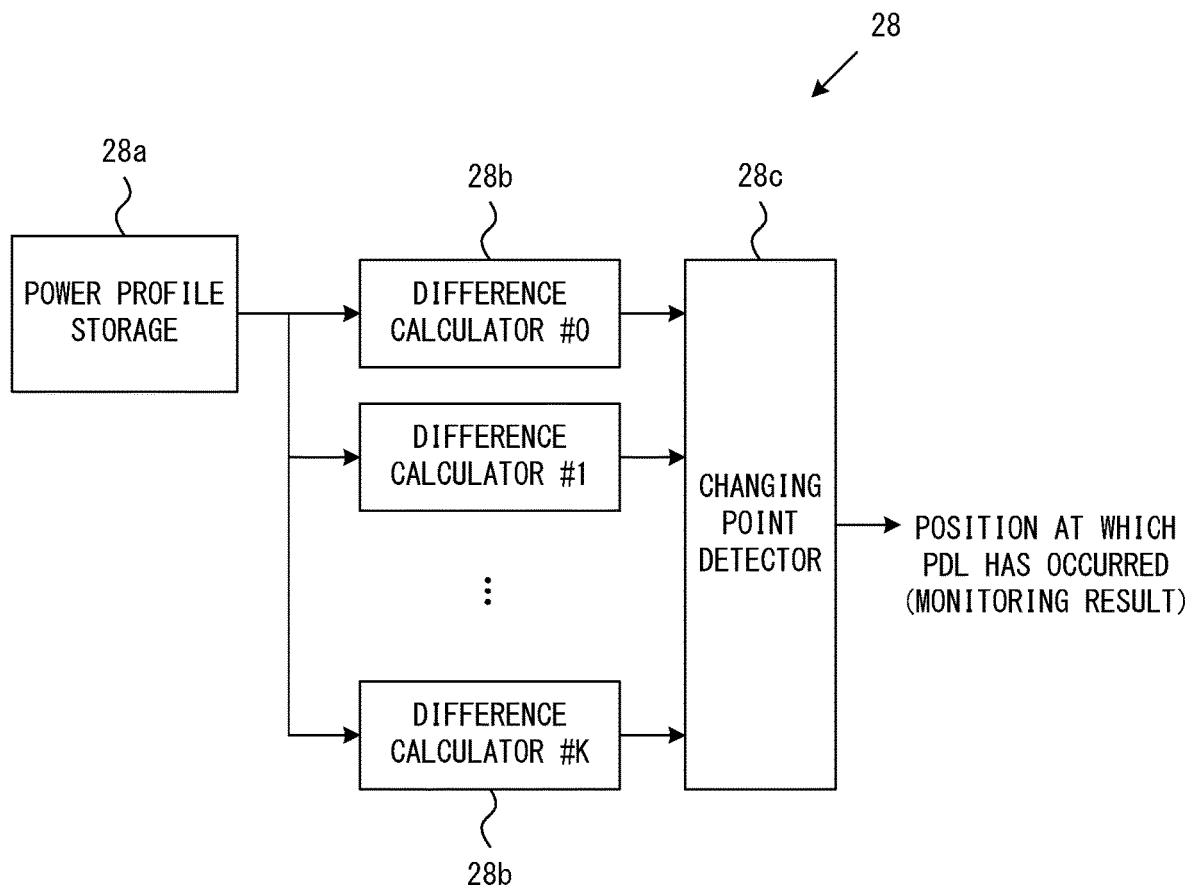
F I G. 1 4

| MEASUREMENT POSITION | X0 | X1 | X2 | X3 | X4 | X5 |
|---|---|---|---|---|---|---|
| ROTATION AMOUNT : $\theta 1$ | 80 | 70 | 60 | 50 | 40 | 30 |
| ROTATION AMOUNT : $\theta 2$ | 81 | 70 | 55 | 44 | 35 | 26 |
| ROTATION AMOUNT : $\theta 3$ | 80 | 71 | 50 | 40 | 31 | 21 |
| ROTATION AMOUNT : $\theta 4$ | 80 | 71 | 54 | 45 | 35 | 26 |
| ROTATION AMOUNT : $\theta 5$ | 81 | 69 | 59 | 48 | 39 | 30 |
| DIFFERENCE | 1 | 2 | 10 | 10 | 9 | 9 |

FIG. 16

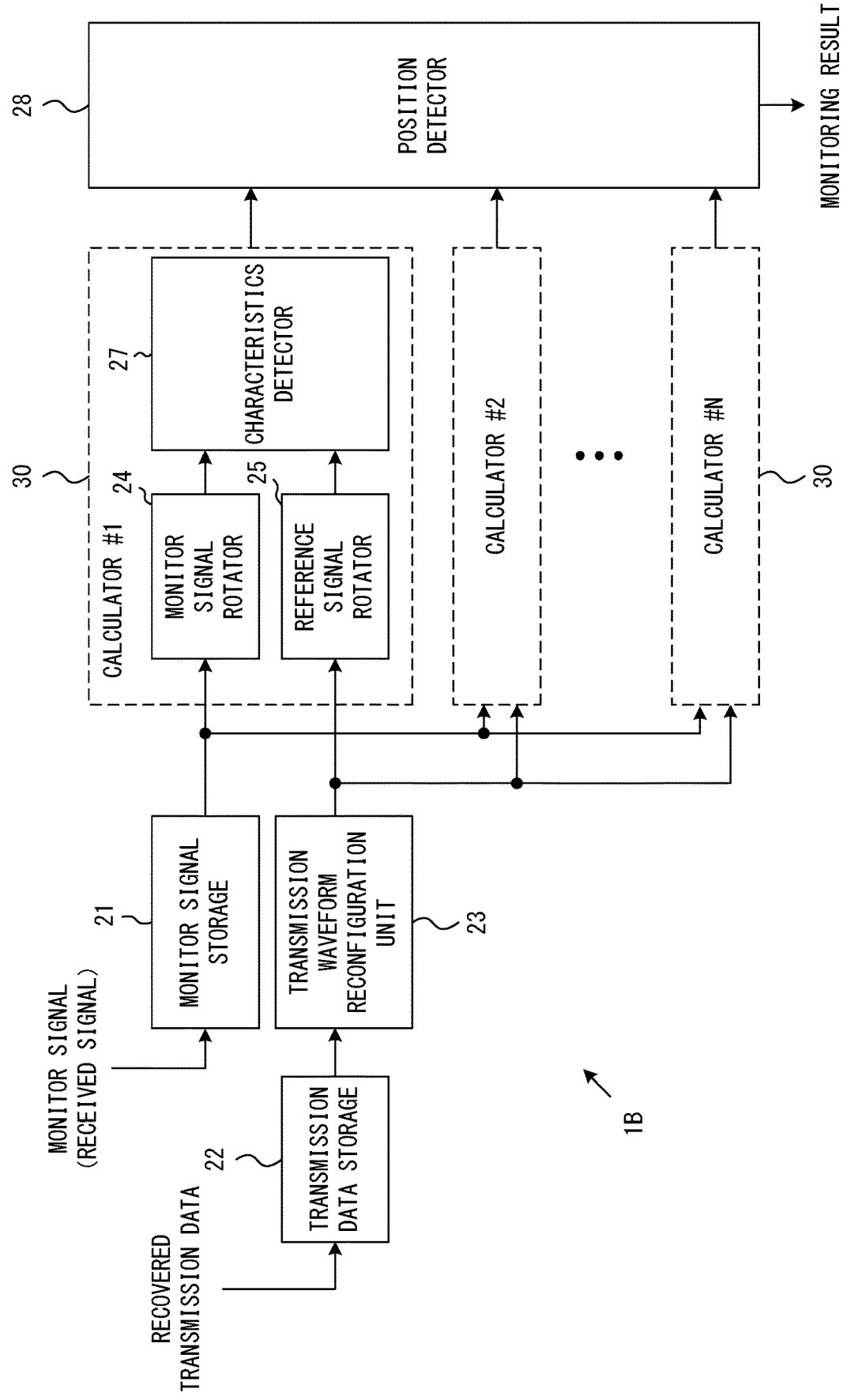
F I G. 19

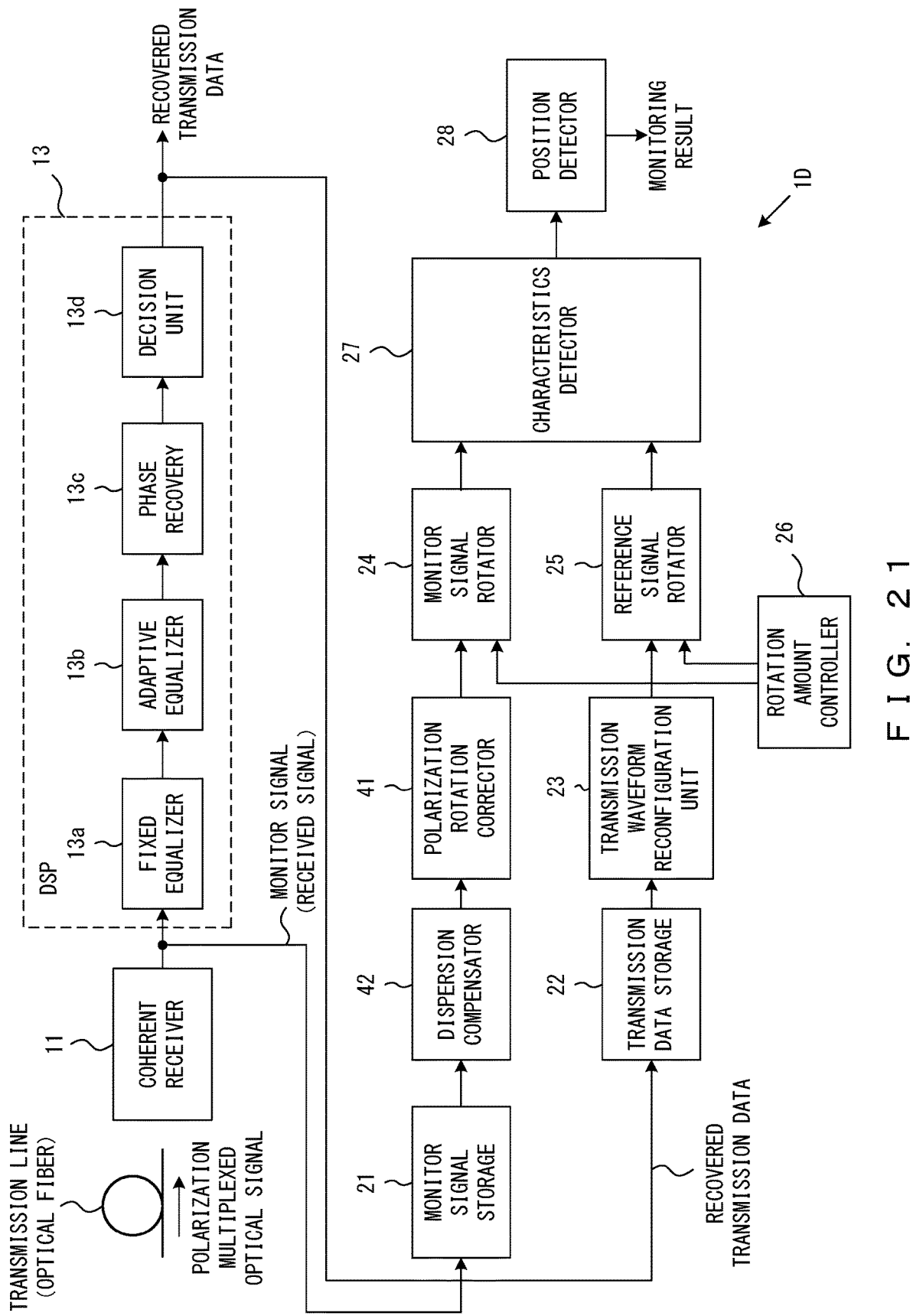
F I G. 21

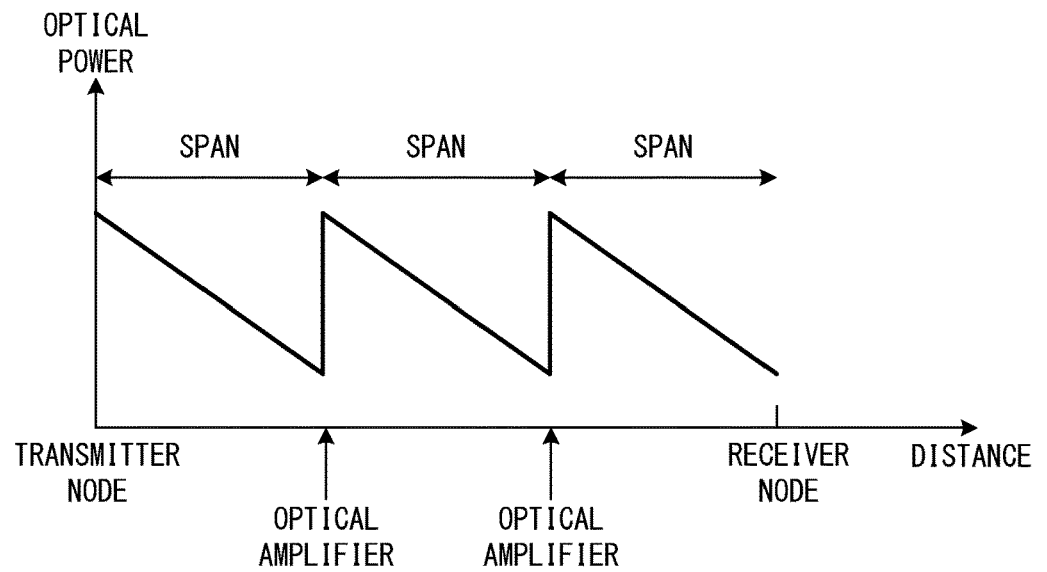
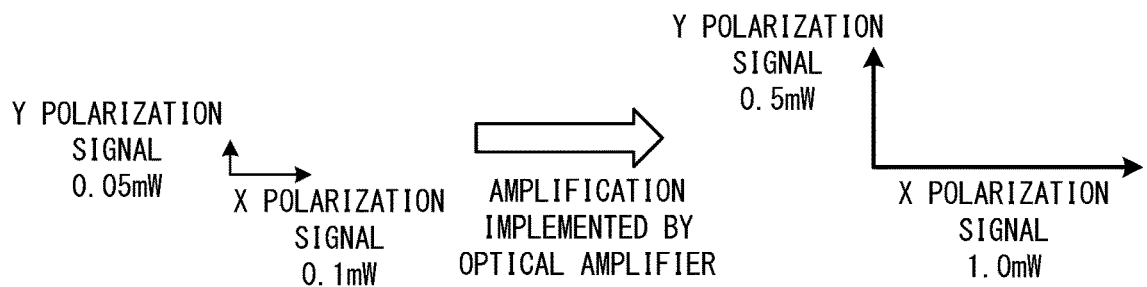
FIG. 24

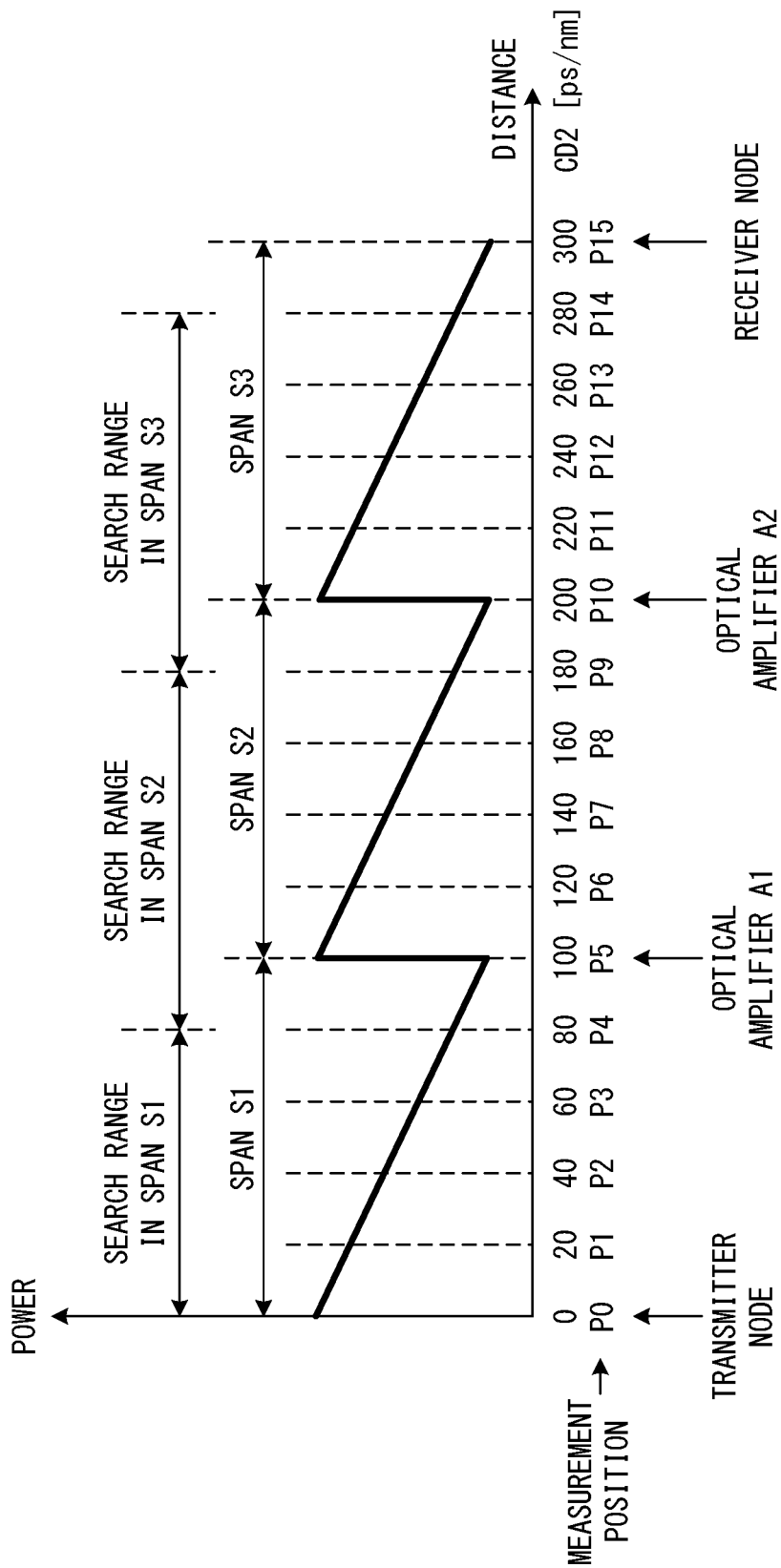
F I G. 27

POWER OF X POLARIZATION

| | | | | | | | | | | | | | | | | |
|---|---|---|---|---|---|---|---|---|---|---|---|---|---|---|---|---|
| CD1 | 300 | 280 | 260 | 240 | 220 | 200 | 180 | 160 | 140 | 120 | 100 | 80 | 60 | 40 | 20 | 0 |
| CD2 | 0 | 20 | 40 | 60 | 80 | 100 | 120 | 140 | 160 | 180 | 200 | 220 | 240 | 260 | 280 | 300 |
| POSITION | P0 | P1 | P2 | P3 | P4 | P5 | P6 | P7 | P8 | P9 | P10 | P11 | P12 | P13 | P14 | P15 |
| 0° | x00 | x01 | x02 | x03 | x04 | x05 | x06 | x07 | x08 | x09 | x0a | x0b | x0c | x0d | x0e | x0f |
| 45° | x10 | x11 | x12 | x13 | x14 | x15 | x16 | x17 | x18 | x19 | x1a | x1b | x1c | x1d | x1e | x1f |
| 90° | x20 | x21 | x22 | x23 | x24 | x25 | x26 | x27 | x28 | x29 | x2a | x2b | x2c | x2d | x2e | x2f |
| 135° | x30 | x31 | x32 | x33 | x34 | x35 | x36 | x37 | x38 | x39 | x3a | x3b | x3c | x3d | x3e | x3f |

POWER OF Y POLARIZATION

| | | | | | | | | | | | | | | | | |
|---|---|---|---|---|---|---|---|---|---|---|---|---|---|---|---|---|
| CD1 | 300 | 280 | 260 | 240 | 220 | 200 | 180 | 160 | 140 | 120 | 100 | 80 | 60 | 40 | 20 | 0 |
| CD2 | 0 | 20 | 40 | 60 | 80 | 100 | 120 | 140 | 160 | 180 | 200 | 220 | 240 | 260 | 280 | 300 |
| POSITION | P0 | P1 | P2 | P3 | P4 | P5 | P6 | P7 | P8 | P9 | P10 | P11 | P12 | P13 | P14 | P15 |
| 0° | y00 | y01 | y02 | y03 | y04 | y05 | y06 | y07 | y08 | y09 | y0a | y0b | y0c | y0d | y0e | y0f |
| 45° | y10 | y11 | y12 | y13 | y14 | y15 | y16 | y17 | y18 | y19 | y1a | y1b | y1c | y1d | y1e | y1f |
| 90° | y20 | y21 | y22 | y23 | y24 | y25 | y26 | y27 | y28 | y29 | y2a | y2b | y2c | y2d | y2e | y2f |
| 135° | y30 | y31 | y32 | y33 | y34 | y35 | y36 | y37 | y38 | y39 | y3a | y3b | y3c | y3d | y3e | y3f |

FIG. 28

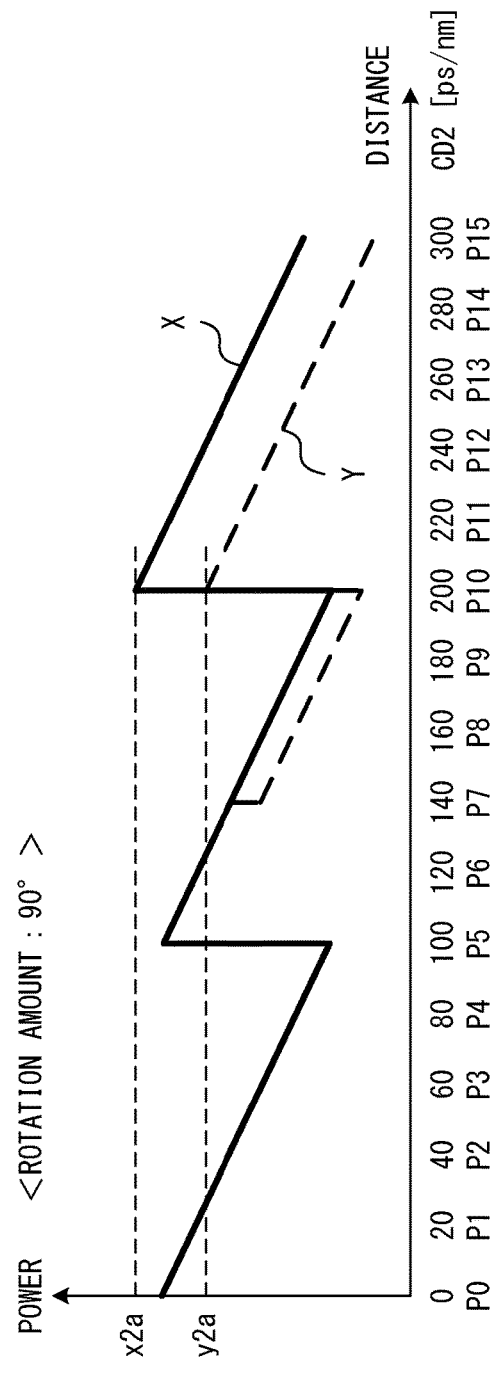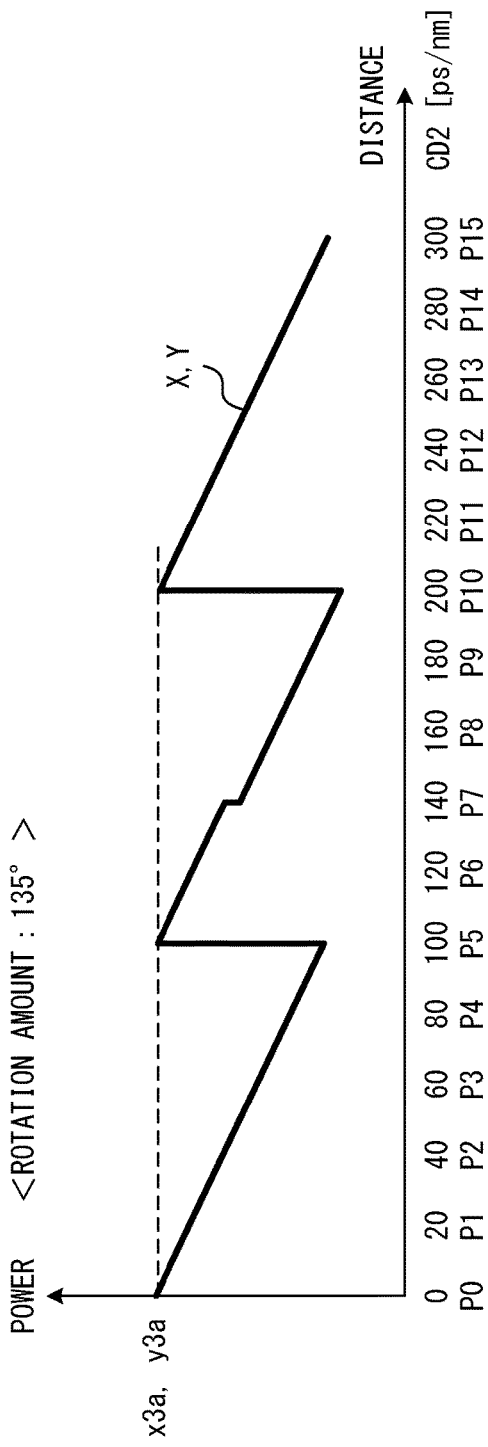

F I G. 3 1 A

<POWER DIFFERENCE OF SPANS>

|  | POLARIZATION ROTATION AMOUNTS | | | |
| --- | --- | --- | --- | --- |
|  | 0° | 45° | 90° | 135° |
| SPAN S1 ( P0 ) | x00−y00 | x10−y10 | x20−y20 | x30−y30 |
| SPAN S2 ( P5 ) | x05−y05 | x15−y15 | x25−y25 | x35−y35 |
| SPAN S3 ( P10 ) | x0a−y0a | x1a−y1a | x2a−y2a | x3a−y3a |

F I G. 3 1 B

<DECISION RESULTS FOR SPANS>

|  | POWER DIFFERENCE GREATER THAN THRESHOLD |
| --- | --- |
| SPAN S1 ( P0 ) | No |
| SPAN S2 ( P5 ) | No |
| SPAN S3 ( P10 ) | Yes |

OPTICAL NETWORK DEVICE AND METHOD FOR MONITORING TRANSMISSION LINE

CROSS-REFERENCE TO RELATED APPLICATIONS

This application is based upon and claims the benefit of priority of the prior Japanese Patent Applications No. 2020-216284, filed on Dec. 25, 2020 and No. 2021-185433, filed on Nov. 15, 2021, the entire contents of which are incorporated herein by reference.

FIELD

The embodiments discussed herein are related to an optical network device and a method for monitoring an optical transmission line.

BACKGROUND

There is a need for optical fiber communications for long-distance transmissions and large-capacity transmissions due to an increase in communication traffic amounts. In the meantime, communications are performed with performance close to the limit of transmission devices, and thus a change in the state of an optical transmission line may constitute a factor that degrades transmission characteristics. One cause of such degradation of transmission characteristics is a polarization dependent loss (PDL). A PDL is a phenomenon in which an insertion loss differs in accordance with the angle of polarizations, and occurs not only in fabricating a device or the like but also occurs during an operation due to a route change in an optical node, reconnection of an optical fiber, a bend in an optical fiber, or the like.

Presence of a PDL results in, for example, a decrease in reception power for any of the polarizations, thereby reducing transmission qualities. Hence, it will be important to detect the state of a PDL during an operation in order to shorten a period in which the performance of a transmission system is decreased.

For example, in measurement of a PDL, test light with a single polarization is input from a transmitter node to an optical fiber transmission line, while changing the angle of the polarization of the test light little by little. A receiver node measures the power of light output from the optical fiber transmission line for each polarization, and calculates the PDL according to the largest value and the smallest value of the measured values.

As with a PDL, a polarization dependent gain (PDG) is known as a phenomenon in which there is a power difference between polarizations. A PDG, which is a phenomenon in which the gain of an optical amplifier differs according to a polarization state, may occur in a distributed Raman amplifier.

For an optical transmission system, a method for detecting the position of a failure and a cause of the failure has been proposed (e.g., Japanese Laid-open Patent Publication No. 2020-088628). In addition, a device for estimating nonlinearity in a channel has been proposed (e.g., Japanese Laid-open Patent Publication No. 2013-074625).

As described above, PDL may be measured or estimated. However, it is difficult to detect which position on an optical transmission line a PDL has occurred by using the above-described method (i.e., the method wherein while the angle of the polarization is being changed, the receiver node calculates the PDL from the largest value and the smallest value of optical power). In addition, in this method, dedicated test light for measuring the PDL is input to the optical transmission line, and hence communication services need to be stopped when measuring the PDL.

Tapping optical signals at a plurality of positions on an optical transmission line so as to monitor optical power may allow for detection of a position at which a PDL has occurred. However, this method will need much effort and time to detect the position at which a PDL has occurred. In particular, considerable effort and time will be needed to search an optical transmission line having a length of several hundreds of kilometers.

SUMMARY

According to an aspect of the embodiments, an optical network device includes: a receiver configured to receive a polarization multiplexed optical signal transmitted from a transmitter node; and a processor. The processor separates an electric-field-information signal indicating an electric field of the polarization multiplexed optical signal into a first polarization component and a second polarization component orthogonal to each other. The processor generates a third polarization component and a fourth polarization component orthogonal to each other by controlling the first polarization component and the second polarization component in a coordinate system indicating a first polarization direction and a second polarization direction orthogonal to each other. The processor calculates an evaluation value corresponding to at least either a power of the third polarization component or a power of the fourth polarization component for each of a plurality of positions on an optical transmission line between the transmitter node and the optical network device. The processor calculates, for each of the plurality of positions, a variation in the evaluation value that is associated with a control amount in the controlling. The processor decides whether a first position among the plurality of positions is a position to be detected based on a result of comparing a variation in an evaluation value calculated for the first position with a variation in an evaluation value calculated for a second position adjacent to the first position among the plurality of positions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a method for measuring the power of an optical signal at an arbitrary position on a transmission line;

FIG. 3 illustrates an example of changes in the power of an optical signal and in chromatic dispersion in the optical signal;

FIG. 5 illustrates an example of a method for detecting a position of occurrence of a polarization dependent loss;

FIG. 9 illustrates an example of an optical network device in accordance with embodiments of the invention;

FIG. 12 is a flowchart illustrating an example of a method for detecting a position of occurrence of a polarization dependent loss;

FIG. 14 illustrates an example of a position detector;

FIG. 16 illustrates another example of a method for detecting a position at which a polarization dependent loss has occurred;

FIG. 19 illustrates a first variation of an optical network device in accordance with embodiments of the present invention;

FIG. 21 illustrates a third variation of an optical network device in accordance with embodiments of the present invention;

FIG. 24 is an explanatory diagram for amplification performed by optical amplifiers implemented on an optical transmission line;

FIG. 27 illustrates an example of spans and a power profile;

FIG. 28 illustrates an example of a power profile for an optical transmission line indicated in FIG. 27;

FIGS. 29A, 29B, 30A and 30B illustrate an example of a change in a power profile with respect to a polarization rotational processing operation;

FIGS. 31A and 31B illustrate power differences and decision results for spans;

DESCRIPTION OF EMBODIMENTS

Figure 2:
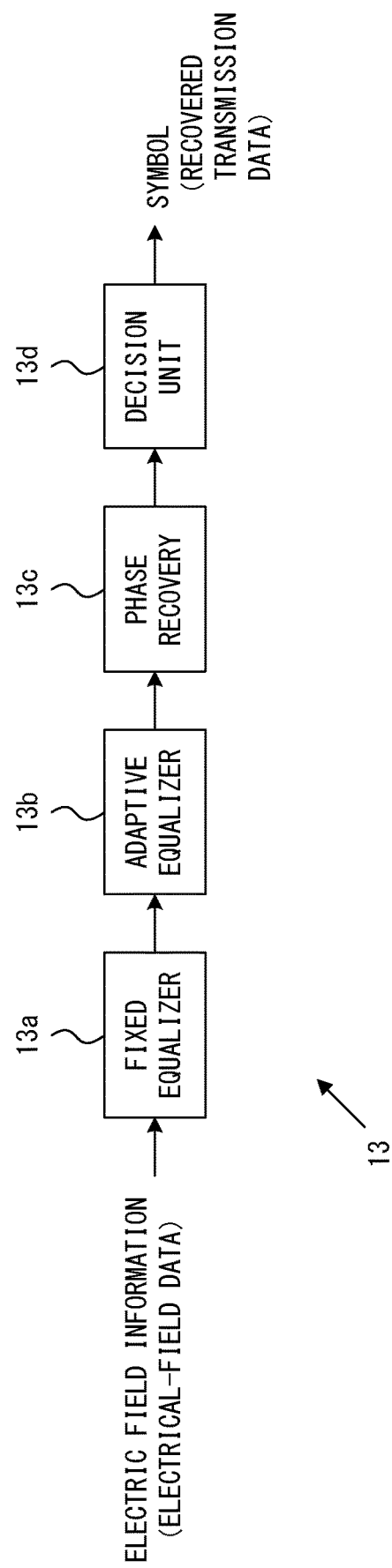
FIG. 2 illustrates an example of the function of a digital signal processor.

The present application is related to a technique for detecting a polarization dependent loss (PDL) and estimating a position at which the PDL has occurred. As with a PDL, a polarization dependent gain (PDG) is known, as described above, as a phenomenon in which there is a power difference between polarizations. A PDL and a PDG are both phenomena in which there is a power difference between polarizations during a particular polarization state. Thus, a PDG can be detected using a method that is substantially the same as a method for detecting a PDL. Accordingly, although the following describes the method for detecting a PDL, this method can be applied when detecting a PDG.

An optical network device in accordance with embodiments of the present invention has a function for measuring optical power for an arbitrary position on a transmission line according to a received optical signal and a function for detecting a position at which a polarization dependent loss has occurred by using the result of measurement. Descriptions are given of the function for measuring the power of an optical signal at an arbitrary position on a transmission line before descriptions are given of the function for detecting a position at which a polarization dependent loss has occurred.

FIG. 1 illustrates an example of a method for measuring the power of an optical signal at an arbitrary position on a transmission line. In this example, an optical signal from a transmitter node 100 is transmitted to an optical network device 1 through an optical transmission line (optical fiber).

The optical network device 1 includes a coherent receiver 11, an analog-to-digital converter (ADC) 12, a digital signal processor (DSP) 13, a simulated transmitter 14, a memory circuit 15, and a characteristics detector 16. The optical network device 1 may include other functions or circuits that are not depicted in FIG. 1.

The coherent receiver 11 includes a 90° optical hybrid circuit and generates an electric-field-information signal indicating the electric field of a received optical signal (or electrical-field data). The electric-field-information signal includes an in-phase (I) component and a quadrature (Q) component of the received optical signal. When the optical signal is a polarization multiplexed optical signal, the electric-field-information signal includes an I component and a Q component of a H polarization and an I component and a Q component of a V polarization. The ADC 12 converts the electric-field-information signal into a digital signal.

FIG. 2 illustrates an example of the function of the digital signal processor 13. As depicted in FIG. 2, the digital signal processor 13 includes a fixed equalizer 13a, an adaptive equalizer 13b, a phase recovery 13c, and a decision unit 13d. The digital signal processor 13 processes electric field information of a received optical signal.

The fixed equalizer 13a compensates for known waveform-degraded components (e.g., chromatic dispersion of the transmission line). The adaptive equalizer 13b adaptively performs equalization. For example, the adaptive equalizer 13b can compensate for residual dispersion. The adaptive equalizer 13b has a function for separating a received optical signal into polarizations when the received optical signal is a polarization multiplexed optical signal. The phase recovery 13c estimates a frequency offset between the transmitter node 100 and the optical network device 1. The phase recovery 13c recovers the phase of an optical signal transmitted from the transmitter node 100. Thus, for each symbol, a signal point on a constellation is recovered. The decision unit 13d recovers transmission data according to constellation information (a phase and an amplitude) output from the phase recovery 13c. The decision unit 13d may be included in the digital signal processor 13 or may be provided separately from the digital signal processor 13. The digital signal processor 13 may include an error correction circuit on the output side of the decision unit 13d.

The simulated transmitter 14 generates an electric-field-information signal by mapping transmission data recovered by the digital signal processor 13 (or decision unit 13d) onto a constellation. This mapping is the same as the mapping performed by the transmitter node 100. Thus, the electric-field-information signal generated by the simulated transmitter 14 is substantially the same as an electric-field-information signal for generating an optical signal in the transmitter node 100. Accordingly, an output signal of the simulated transmitter 14 indicates the electric field of the optical signal in the transmitter node 100.

The memory circuit 15 stores an electric-field-information signal indicating the electric field of a received optical signal. The electric-field-information signal indicates a state before compensation for chromatic dispersion of the transmission line.

The characteristics detector 16 includes a first dispersion compensator 16a, a nonlinear compensator 16b, a second dispersion compensator 16c, and a correlation calculator 16d and compensates for chromatic dispersion and nonlinear distortion in an electric-field-information signal indicating the electric field of a received optical signal. The first dispersion compensator 16a compensates for a portion of a chromatic dispersion (hereinafter, a "first chromatic dispersion") of the transmission line in the electric-field-information signal. The nonlinear compensator 16b compensates for a nonlinear distortion of the transmission line in an output signal of the first dispersion compensator 16a. The second dispersion compensator 16c compensates for the remaining chromatic dispersion (hereinafter, a "second chromatic dispersion) of the transmission line in an output signal of the nonlinear compensator 16b. The correlation calculator 16d calculates a correlation between an output signal of the second dispersion compensator 16c and an output signal of the simulated transmitter 14. The output signal of the simulated transmitter 14 indicates the electric field of the optical signal in the transmitter node 100, as described above. Accordingly, the correlation calculator 16d calculates a correlation between the electric-field-information signal in which the chromatic dispersion and the nonlinear distortion have been compensated for and the electric-field-information signal indicating the electric field of the optical signal in the transmitter node 100. It is preferable that the output signal of each of the second dispersion compensator 16c and the simulated transmitter 14 be appropriately normalized.

This correlation value indicates the power of the optical signal transmitted through the transmission line. Accordingly, the optical network device 1 can measure the power of the optical signal transmitted through the transmission line by calculating the correlation value. The following describes a relationship between the correlation value and the power of an optical signal by referring to FIG. 3.

FIG. 3 illustrates an example of changes in the power of an optical signal and in chromatic dispersion in the optical signal. In this example, an optical signal is transmitted from the transmitter node 100 to the optical network device 1. An optical amplifier is provided on the transmission line.

The power of the optical signal decreases as the distance from the transmitter node 100 increases. The optical signal is amplified by the optical amplifier. Afterward, the power of the optical signal decreases as the distance from the optical amplifier increases. Cumulative chromatic dispersions added to the optical signal increase in proportion to the distance from the transmitter node 100. Note that the "CD" indicated in FIG. 3 represents the total chromatic dispersion of the transmission line between the transmitter node 100 and the optical network device 1.

In this example, the optical network device 1 measures the power of the optical signal at a position P depicted in FIG. 3. Note that the chromatic dispersion of the transmission line between the optical network device 1 and the position P is CD1. The chromatic dispersion between the position P and the transmitter node 100 is CD2. The sum of CD1 and CD2 is CD.

As described above, the characteristics detector 16 compensates for chromatic dispersion and nonlinear distortion. In particular, the first dispersion compensator 16a compensates for the chromatic dispersion CD1 in an electric-field-information signal indicating the received optical signal. The nonlinear compensator 16b compensates for the nonlinear distortion in an output signal of the first dispersion compensator 16a. In this case, the nonlinear compensator 16b compensates for nonlinear distortion of specified amount. The second dispersion compensator 16c compensates for the chromatic dispersion CD2 in an output signal of the nonlinear compensator 16b.

The amount of nonlinear distortion that occurs on the optical transmission line is dependent on the power of an optical signal. In particular, the amount of nonlinear distortion increases as the power of the optical signal becomes larger. In this example, the nonlinear compensator 16b is designed to compensate for a nonlinear distortion that occurs when the power of an optical signal is sufficiently large. For example, the nonlinear compensator 16b may be designed to compensate for a nonlinear distortion that occurs an optical power of the optical signal is equal to an output optical power of the transmitter node 100.

Meanwhile, the correlation value calculated by the correction calculator 16d indicates the correlation between the electric-field-information signal in which the chromatic dispersion and the nonlinear distortion have been compensated for in the characteristics detector 16 and the electric-field-information signal indicating the electric field of the optical signal in the transmitter node 100. Thus, a correlation value calculated by the correlation calculator 16b will be large when the nonlinear compensator 16b appropriately compensates for nonlinear distortion.

Accordingly, when the power of the optical signal at the position P is large, the amount of nonlinear distortion at the position P will be large, and the difference between the amount of nonlinear distortion at the position P and the amount of nonlinear distortion to be compensated for by the nonlinear compensator 16b will be small. As a result, the nonlinear compensator 16b appropriately compensates for the nonlinear dispersion, and the correlation calculator 16d calculates a large correlation value. That is, when the power of the optical signal at the position P is large, the correlation value becomes large. When the power of the optical signal at the position P is small, the amount of nonlinear distortion at the position P will be small, and the difference between the amount of nonlinear distortion at the position P and the amount of nonlinear distortion to be compensated for by the nonlinear compensator 16b will be large. As a result, the nonlinear compensator 16b does not appropriately compensate for the nonlinear dispersion, and the correlation calculator 16d calculates a small correlation value. That is, when the power of the optical signal at the position P is small, the correlation value becomes small. Thus, the correlation value calculated in the characteristics detector 16 substantially indicates the power of an optical signal at a specified position on the transmission line (position P in FIG. 3). Note that the correlation value is an example of an evaluation value that corresponds to the power of an optical signal on the transmission line.

The position P indicated in FIG. 3 is specified by a combination of the chromatic dispersion CD1 and the chromatic dispersion CD2. Thus, for the electric-field-information signal indicating the electric field of the received optical signal, the characteristics detector 16 can measure the power of the optical signal at a desired position on the transmission line by changing the combination of the chromatic dispersion CD1 and the chromatic dispersion CD2.

Figure 4:
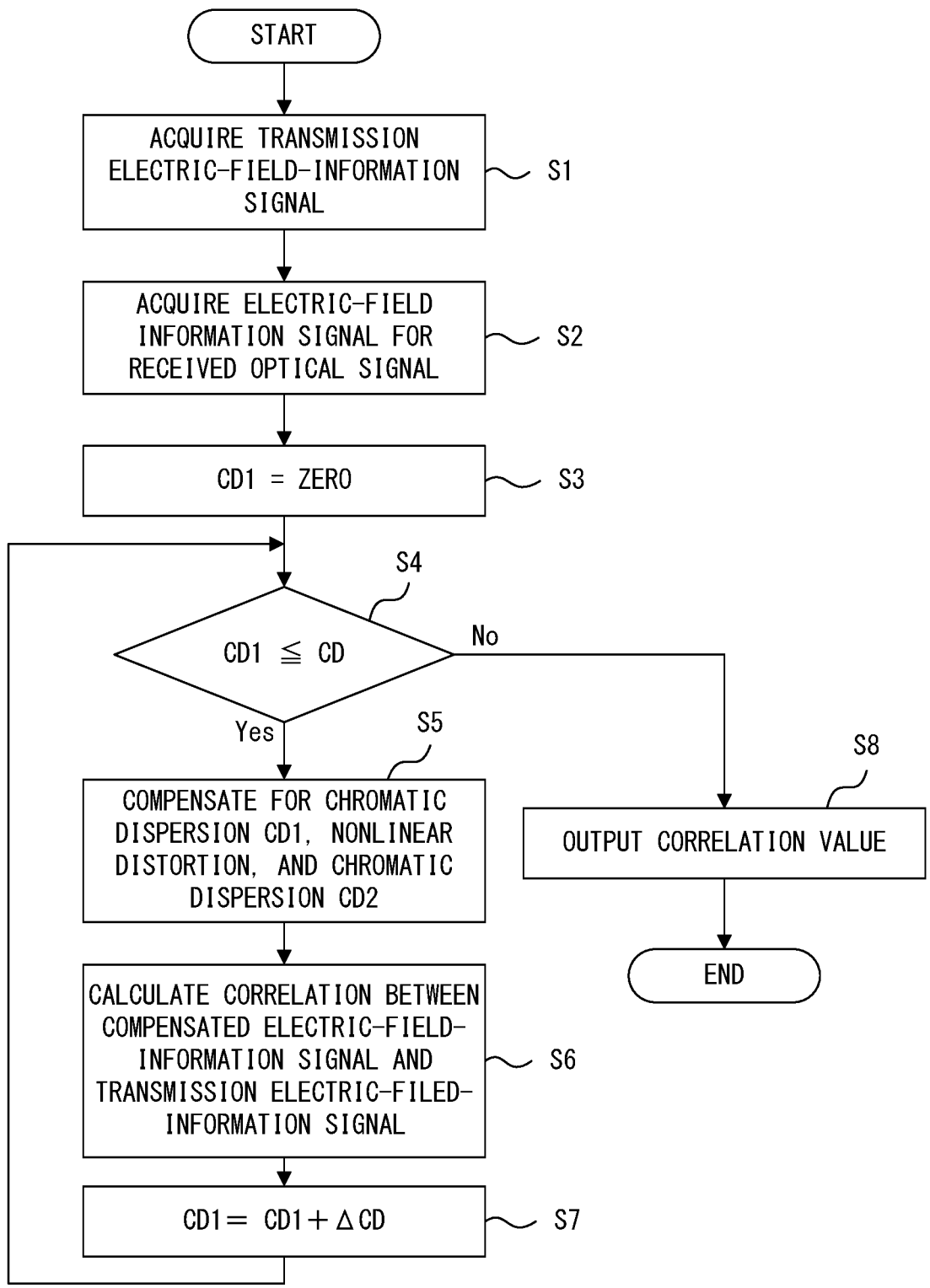
FIG. 4 is a flowchart illustrating an example of a process of measuring the power of an optical signal at a plurality of positions on a transmission line.

FIG. 4 is a flowchart illustrating an example of a process of measuring the power of an optical signal at a plurality of positions on a transmission line. This process is performed when the optical network device 1 receives, via the transmission line, an optical signal transmitted from the transmitter node 100.

In S1, the characteristics detector 16 acquires a transmission electric-field-information signal generated by the simulated transmitter 14. This transmission electric-field-information signal indicates the electric field of an optical signal in the transmitter node 100. In S2, the characteristics detector 16 acquires the electric-field-information signal for the received optical signal. This electric-field-information signal is generated by the coherent receiver 11 and stored in the memory circuit 15.

In S3, the characteristics detector 16 initializes the chromatic dispersion CD1 to "zero." The value of chromatic dispersion CD1 corresponds to a transmission distance from the optical network device 1. The chromatic dispersion CD2 is calculated according to "CD1+CD2=CD." CD represents the total chromatic dispersion of the transmission line between the transmitter node 100 and the optical network device 1 and is a known value. In S4, the characteristics detector 16 decides whether the chromatic dispersion CD1 is less than or equal to CD. When the chromatic dispersion CD1 is less than or equal to CD, the process of the characteristics detector 16 shifts to S5.

In S5, for the electric-field-information signal for the received optical signal, the characteristics detector 16 sequentially performs compensation of the chromatic dispersion CD1, nonlinear compensation, and compensation of the chromatic dispersion CD2. In S6, the characteristics detector 16 calculates a correlation between the electric-field-information signal compensated in S6 and the transmission electric-field-information signal acquired in S1.

In S7, the characteristics detector 16 increases the chromatic dispersion CD1 by ΔCD. Subsequently, the process of the characteristics detector 16 returns to S4. In particular, the characteristics detector 16 calculates correlation values by repeatedly performing S4-S7 until the chromatic dispersion CD1 becomes larger than CD, while increasing the chromatic dispersion CD1 by ΔCD in each of the repetitions. The value of chromatic dispersion CD1 corresponds to the transmission distance from the optical network device 1. Thus, the process of increasing the chromatic dispersion CD1 by ΔCD is equivalent to a process of shifting a position on the transmission line by a distance that corresponds to ΔCD. Accordingly, the characteristics detector 16 calculates correlation values for a plurality of positions on the transmission line by repeatedly performing the processes of S4-S7.

When the chromatic dispersion CD1 becomes larger than CD, the characteristics detector 16 outputs, in S8, the correlation values calculated in S4-S7. The correlation values substantially indicate the powers of the optical signal at specified positions on the transmission line, which correspond to combinations of the chromatic dispersions CD1 and CD2. Accordingly, the characteristics detector 16 can detect the powers of the optical signal at a plurality of positions on the transmission line. Note that information indicating the powers of an optical signal at a plurality of positions on a transmission line may hereinafter be referred to as a "power profile."

As described above, the optical network device 1 can measure the power of an optical signal at a desired position on the transmission line. Using this function, the optical network device 1 estimates a polarization dependent loss at a desired position on the transmission line.

FIG. 5 illustrates an example of a method for detecting a position of occurrence of a polarization dependent loss. In this example, a transmitter node 200 includes a polarization rotator 201, a digital-to-analog converter (DAC) 202, and a modulator 203.

The polarization rotator 201 controls the polarization of an optical signal. However, the polarization rotator 201 does not directly control the polarization of the optical signal but controls the polarization of the optical signal by correcting an electric-field-information signal for generating the optical signal. In this case, the polarization rotation is implemented by, for example, multiplying a Jones matrix by an electric-field-information signal indicating the main signal. For example, the polarization rotation amount may be changed in increments of 10 degrees from zero degrees to 180 degrees.

The DAC 202 converts an output signal of the polarization rotator 201 into an analog signal. The modulator 203 generates a modulated optical signal based on an output signal of the DAC 202. Thus, the polarization of the optical signal is controlled by the polarization rotator 201. An optical signal transmitted from the transmitter node 200 propagates through the transmission line. An optical network device 300 receives the optical signal via the transmission line. Note that the amount of polarization rotation provided by the polarization rotator 201 is reported from the transmitter node 200 to the optical network device 300.

The optical network device 300 includes a coherent receiver 301, an ADC 302, a digital signal processor 303, a memory circuit 304, a characteristics detector 305, and a position detector 306. The coherent receiver 301, the ADC 302, the digital signal processor 303, the memory circuit 304, and the characteristics detector 305 correspond to the coherent receiver 11, ADC 12, digital signal processor 13, memory circuit 15, and characteristics detector 16 depicted in FIG. 1. A transmission electric-field-information signal is generated by a function equivalent to the simulated transmitter 14 depicted in FIG. 1.

The digital signal processor 303 recovers a main signal according to an electric-field-information signal indicating the electric field of a received optical signal. The electric-field-information signal is stored in the memory circuit 304. The optical network device 300 acquires information indicating the amount of polarization rotation from the transmitter node 200.

As described above by referring to FIGS. 1-4, the characteristics detector 305 can detect the power of an optical signal at an arbitrary position on a transmission line by calculating the correlation between a transmission signal and a received signal. In this example, the characteristics detector 305 detects the powers of an optical signal at a plurality of positions on the transmission line. The characteristics detector 305 also detects the power of an optical signal for each polarization rotation amount of the optical signal. Accordingly, the characteristics detector 305 detects, for each polarization rotation amount, the powers of the optical signal at a plurality of positions on the transmission line.

The position detector 306 decides, for positions on the transmission line (i.e., measurement positions), whether a polarization dependent loss has occurred. For example, it may be decided that a polarization dependent loss has occurred if the difference between the largest value and the smallest value of optical powers detected for each of a plurality of polarization rotation amounts is larger than a threshold. According to a result of the decision, the position detector 306 detects the position at which the polarization dependent loss has occurred.

As described above, in the example depicted in FIG. 5, the polarization of an optical signal transmitted from the transmitter node 200 is rotated (for example, 0°, 10°, 20°, ...) to detect a position of occurrence of a polarization dependent loss. However, the optical network device 300 estimates a polarization dependent loss by acquiring the electric field information of a received optical signal when the rotation amount of polarization of the optical signal is maintained at each of the specified rotation value. Thus, the method depicted in FIG. 5 could involve a long time to detect a position at which a polarization dependent loss has occurred.

Embodiments

In embodiments of the present invention, a polarization multiplexed optical signal is transmitted from a transmitter node to an optical network device. The polarization multiplexed optical signal is generated by multiplexing a pair of optical signals having polarizations orthogonal to each other.

Electric field information Ex and Ey of a received optical signal is expressed by formula 1, where Esx and Esy indicate electric field information of a transmission optical signal, and A indicates a transfer function for a transmission line.

$$\begin{pmatrix} Ex \\ Ey \end{pmatrix} = A \begin{pmatrix} Esx \\ Esy \end{pmatrix} \quad (1)$$

In this case, in the configuration depicted in FIG. 1, electric field information Ecx and Ecy is generated by compensating for dispersion and a nonlinear distortion in the electric field information Ex and Ey indicating the electric field of the received optical signal. Each of Ex, Ey, Ecx, and Ecy is a complex number having information on an electric field intensity and an optical phase. In the method described above by referring to FIGS. 1 and 4, the optical power at an arbitrary position on the transmission line is measured by calculating the correlation between the absolute value of Ecx and the absolute value of Esx and/or the correlation between the absolute value of Ecy and the absolute value of Esy.

A polarization dependent loss is indicated by rotational transformation into a direction such that the loss occurs, addition of the loss, and rotational transformation into a reverse direction for returning to the original polarization state. Thus, a polarization dependent loss is expressed by formula 2. φ indicates the rotation amount of rotational transformation into the direction such that the loss occurs, and Γ (0<Γ≤1) indicates the loss.

$$\begin{pmatrix} \cos\phi & \sin\phi \\ -\sin\phi & \cos\phi \end{pmatrix} \begin{pmatrix} 1 & 0 \\ 0 & \Gamma \end{pmatrix} \begin{pmatrix} \cos\phi & -\sin\phi \\ \sin\phi & \cos\phi \end{pmatrix} \quad (2)$$

Figure 6A:
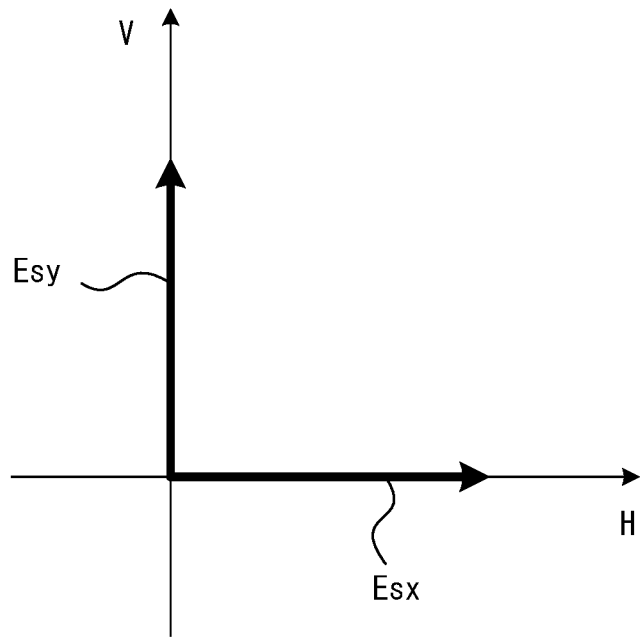
FIGS. 6A and 6B illustrate rotational transformation into a direction such that a loss occurs.
Figure 6B:
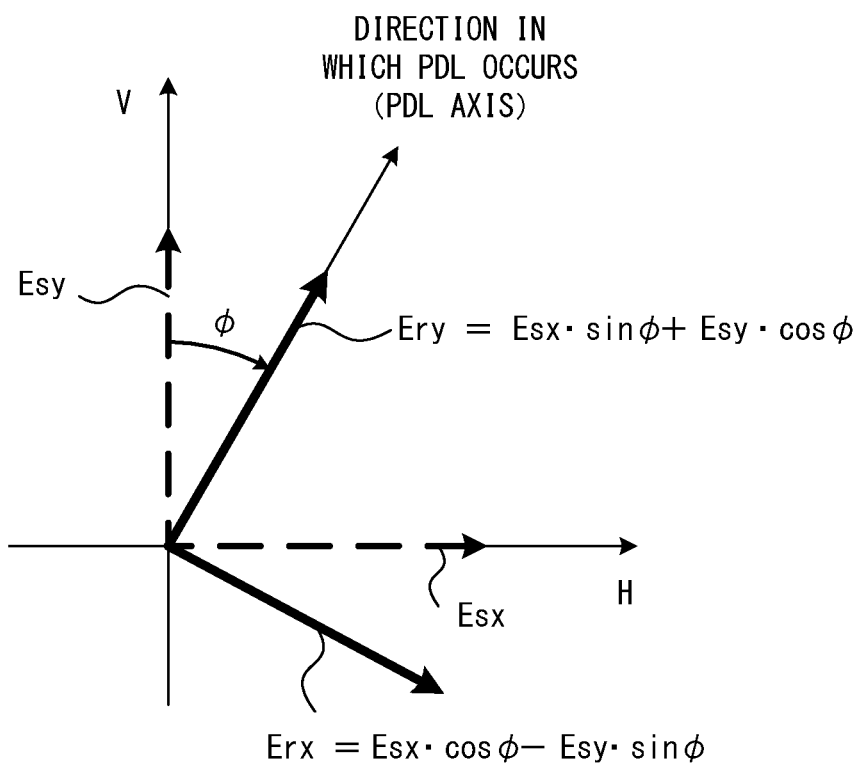

FIGS. 6A and 6B illustrate rotational transformation into a direction such that a loss occurs. φ indicates the direction in which a loss occurs. In this case, formula (3) expresses rotational transformation into the direction in which a loss occurs. Erx and Ery indicate polarization components after rotational transformation. Thus, Ery corresponds to the sum of the projection component of Esx and the projection component of Esy with respect to a PDL axis. Erx corresponds to the sum of the projection component of Esx and the projection component of Esy with respect to an axis orthogonal to the PDL axis. Each of Erx, Ery, Esx, and Esy is a complex number having information on an electric field intensity and an optical phase.

$$\begin{pmatrix} Erx \\ Ery \end{pmatrix} = \begin{pmatrix} \cos\phi & -\sin\phi \\ \sin\phi & \cos\phi \end{pmatrix} \begin{pmatrix} Esx \\ Esy \end{pmatrix} = \begin{pmatrix} Esx \cdot \cos\phi - Esy \cdot \sin\phi \\ Esx \cdot \sin\phi + Esy \cdot \cos\phi \end{pmatrix} \quad (3)$$

In rotational transformation, the direction of the polarization of each electric field component (the directions of arrows in FIGS. 6A and 6B) changes, but the power does not change. Thus, when measuring optical power using the method described above by referring to FIGS. 1 and 4, Erx and Ery indicated in FIG. 6B can be used instead of Esx and Esy indicated in FIG. 6A. Accordingly, the power of an optical signal at an arbitrary position on the transmission line can be measured by calculating the correlation between a signal obtained by rotating the polarization of electric field information Ecx and Ecy indicating an electric field obtained by compensating for dispersion and nonlinear distortion in a received optical signal and a signal obtained by rotating the polarization of electric field information Esx and Esy indicating the electric field of a transmission optical signal.

When a polarization dependent loss occurs in the PDL axis direction depicted in FIG. 6B, the optical phase information of Erx does not change, but the optical phase information of Ery changes by the amount of a decrease in the phase rotation amount that occurs due to nonlinear phase noise caused by the polarization dependent loss. Accordingly, using the method described above by referring to FIGS. 1 and 4, the polarization dependent loss can be detected by measuring optical power from optical phase information including the phase noise in Erx/Ery.

Figure 7A:
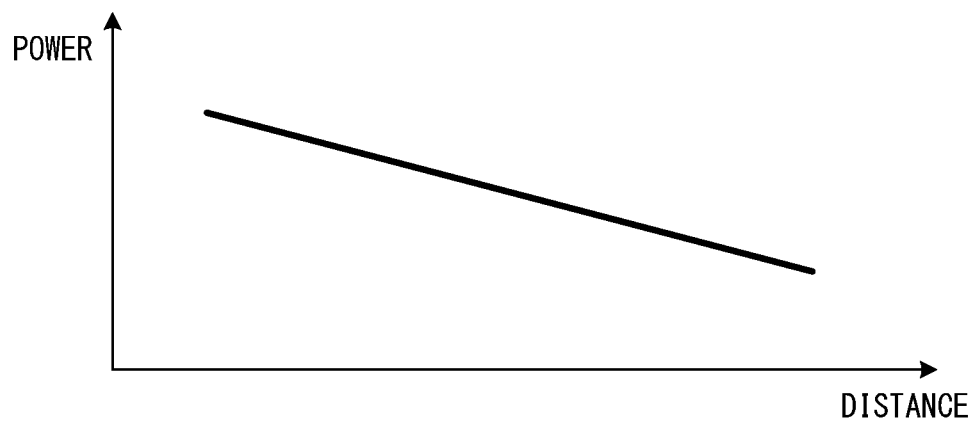
FIGS. 7A and 7B illustrate examples of power profiles.
Figure 7B:
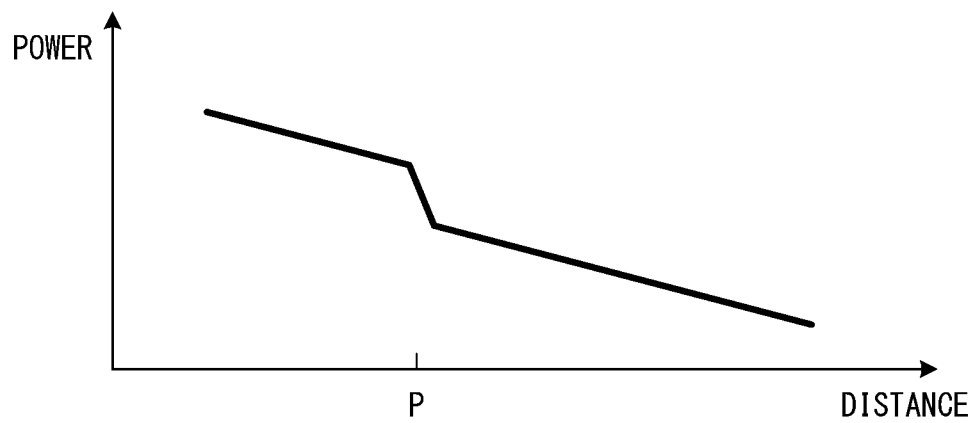

FIGS. 7A and 7B illustrate examples of power profiles. As depicted in FIG. 7A, the power of an optical signal gradually decreases linearly with respect to a transmission distance. However, the power of an optical signal sharply decreases if a local loss occurs on the transmission line. In FIG. 7B, a local loss has occurred at a position P.

In a case where a local polarization dependent loss occurs, the power profile depicted in FIG. 7B is obtained when the direction of the polarization of the optical signal matches the PDL axis. When the direction of the polarization of the optical signal is orthogonal to the PDL axis, the power profile depicted in FIG. 7A is obtained. However, the direction in which a polarization dependent loss occurs (φ in FIG. 6B) is unknown. Accordingly, the optical network device in embodiments of the present invention performs rotational transformation with a plurality of different rotation amounts θi for an electric-field-information signal and creates a power profile for each of the rotation amounts θi.

When the power profile depicted in FIG. 7B is obtained, the position at which power sharply decreases (i.e., position P) is detected.

Figure 8:
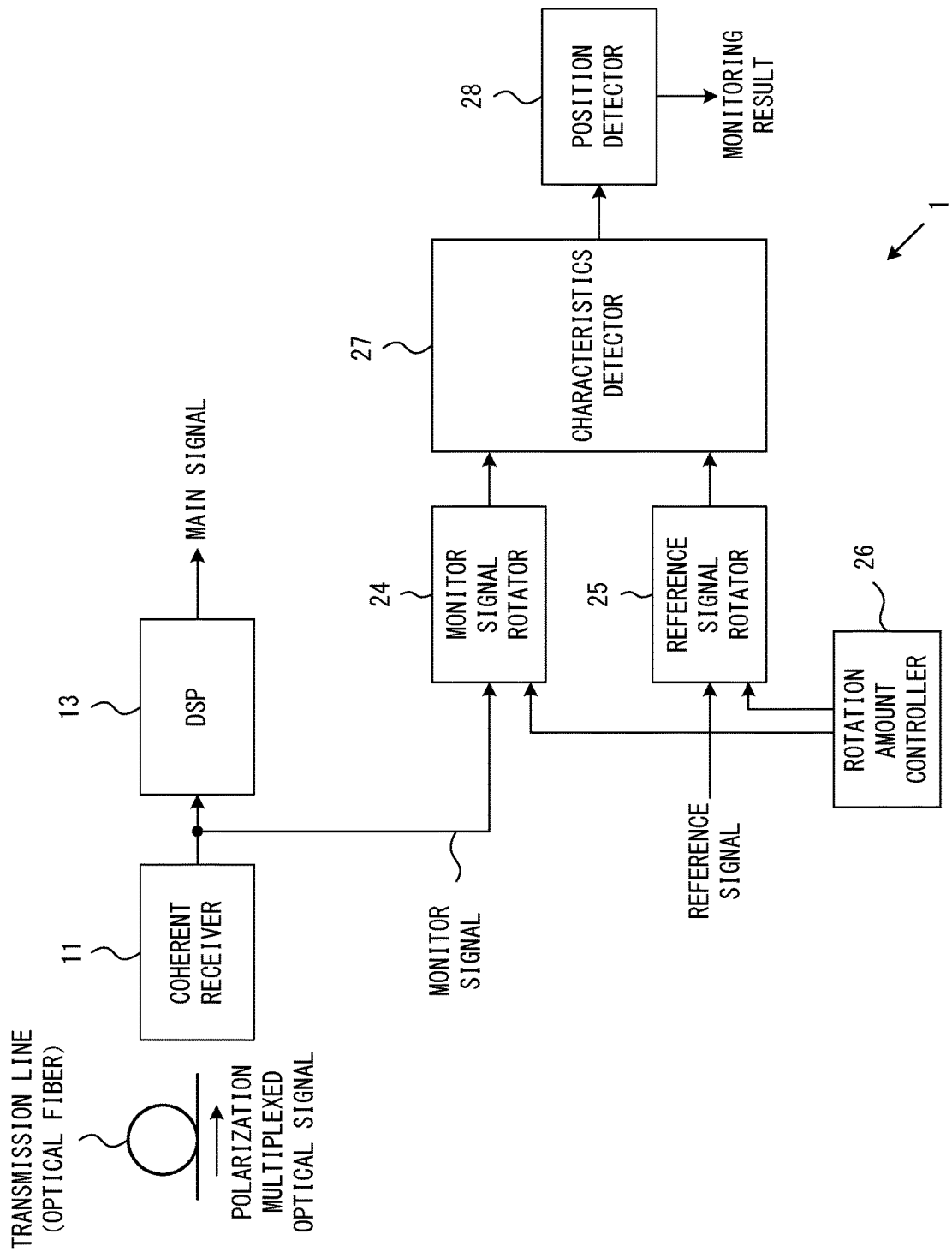
FIG. 8 illustrates an example of an optical network device in accordance with embodiments of the invention.

FIG. 8 illustrates an example of an optical network device in accordance with embodiments of the invention. In an optical network device 1 in accordance with embodiments of the invention, an electric-field-information signal generated by a coherent receiver 11 is guided to a monitor signal rotator 24 as a monitor signal. This electric-field-information signal indicates the electric field of a received optical signal. The monitor signal rotator 24 performs the rotational transformation depicted in FIG. 6B (i.e., the rotational transformation expressed by formula 3) for the monitor signal. A rotation amount controller 26 designates a rotation amount θ. A reference signal indicates the electric field of an optical signal transmitted from the transmitter node 100 depicted in FIG. 1. In the configuration depicted in FIG. 1, for example, the simulated transmitter 14 may acquire the reference signal. A reference signal rotator 25 performs the rotational transformation depicted in FIG. 6B (i.e., the rotational transformation expressed by formula 3) for the reference signal. In this example, the rotation amount of rotational transformation for the monitor signal is the same as the rotation amount of rotational transformation for the reference signal.

A characteristics detector 27 creates a power profile for each of rotation amounts θ (θ1, θ2, ... ). A position detector 28 detects a largest power value and a smallest power value for each of measurement positions on a transmission line. With respect to a position k, when the power Pi calculated for θi is the largest and the power Pj calculated for θj is the smallest, θj is inferred to be the direction of the PDL axis. A difference D between the largest power Pi and the smallest power Pj corresponds to the magnitude of a polarization dependent loss. In this case, a position at which the difference D suddenly changes is considered to be a position at which the polarization dependent loss has occurred. Thus, by calculating a difference D for each position, the position detector 28 can detect a position at which a polarization dependent loss has occurred.

As described above, the position detector 28 decides whether a selected position on the transmission path is a position at which a polarization dependent loss has occurred. The position detector 28 outputs information indicating the position at which a polarization dependent loss has occurred. Thus, the position detector 28 is an example of a deciding unit that decides whether a selected position on a transmission line is a position at which a polarization dependent loss has occurred. For example, information output from the position detector 28 may be stored in a server computer. In this case, a network administrator can inspect the state of the transmission line by using the server computer.

FIG. 9 illustrates an example of an optical network device in accordance with embodiments of the invention. An optical network device 1 receives an optical signal transmitted from the transmitter node 100 depicted in FIG. 1. The transmitter node 100 generates and transmits a polarization multiplexed optical signal. The polarization multiplexed optical signal is generated by combining a pair of optical signals having polarizations orthogonal to each other (i.e., a X-polarization optical signal and a Y-polarization optical signal). The polarization multiplexed optical signal output from the transmitter node 100 propagates through an optical fiber transmission line. The optical network device 1 receives the polarization multiplexed optical signal via the optical fiber transmission line.

As depicted in FIG. 9, the optical network device 1 includes a coherent receiver 11, a digital signal processor 13, a monitor signal storage 21, a transmission data storage 22, a transmission waveform reconfiguration unit 23, a monitor signal rotator 24, a reference signal rotator 25, a rotation amount controller 26, a characteristics detector 27, and a position detector 28. Note that an ADC provided between the coherent receiver 11 and the digital signal processor 13 is omitted. The optical network device 1 may include other circuits or functions that are not depicted in FIG. 9.

The coherent receiver 11 generates electric field information (or electrical-field data) indicating the electric field of a received optical signal. As described above by referring to FIG. 2, the digital signal processor 13 includes a fixed equalizer 13a, an adaptive equalizer 13b, a phase recovery 13c, and a decision unit 13d. Thus, the digital signal processor 13 recovers data transmitted from the transmitter node 100 depicted in FIG. 1 according to electric field information indicating a received optical signal. In this case, the adaptive equalizer 13b separates the electric field information of the received polarization multiplexed optical signal into a pair of polarization components orthogonal to each other (Ex, Ey). As a result, a X-polarization optical signal and a Y-polarization optical signal are extracted. The digital signal processor 13 recovers data from each of the X-polarization optical signal and the Y-polarization optical signal.

The electric field information (Ex, Ey) extracted by the adaptive equalizer 13b is output as a monitor signal. The monitor signal is stored in the monitor signal storage 21. The monitor signal storage 21 may be implemented by a memory.

The transmission data storage 22 stores data recovered by the digital signal processor 13. In this example, as described above, the digital signal processor 13 recovers data transmitted from the transmitter node 100 depicted in FIG. 1. Thus, transmission data is stored in the transmission data storage 22. The transmission data storage 22 may be implemented by a memory.

Figure 10:
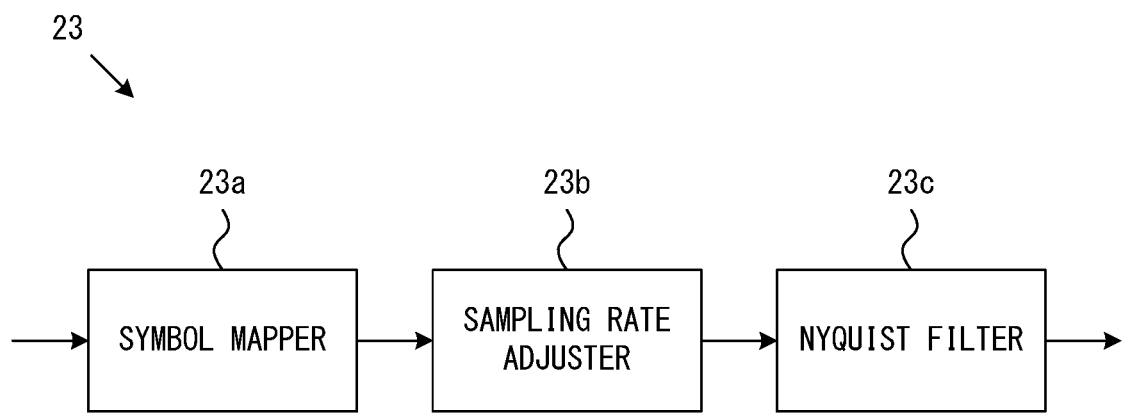
FIG. 10 illustrates an example of a transmission waveform reconfiguration unit.

FIG. 10 illustrates an example of the transmission waveform reconfiguration unit 23. As depicted in FIG. 10, the transmission waveform reconfiguration unit 23 includes a symbol mapper 23a, a sampling rate adjuster 23b, and a Nyquist filter 23c. The transmission waveform reconfiguration unit 23 performs substantially the same signal processing as the transmitter node 100. Thus, the symbol mapper 23a maps, for each of symbols, transmission data stored in the transmission data storage 22. Accordingly, electric field information indicating the transmission data is generated in accordance with a designated modulation scheme. The transmitter node 100 and the symbol mapper 23a use the same modulation scheme. The sampling rate adjuster 23b adjusts the sampling rate of an electric-field-information signal. The Nyquist filter 23c corrects an electric-field-information signal so as to suppress inter-symbol interference. As a result, the electric field information of an optical signal transmitted from the transmitter node 100 is reconfigured. A signal indicating the electric field of a transmission signal obtained by the sampling rate adjuster 23b may hereinafter be referred to as a "reference signal." The transmission waveform reconfiguration unit 23 corresponds to the simulated transmitter 14 depicted in FIG. 1.

Figure 11A:
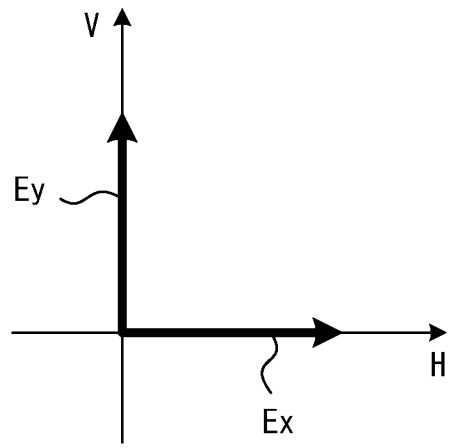
FIGS. 11A-11C are explanatory diagrams for a rotation of polarization of an optical signal.
Figure 11B:
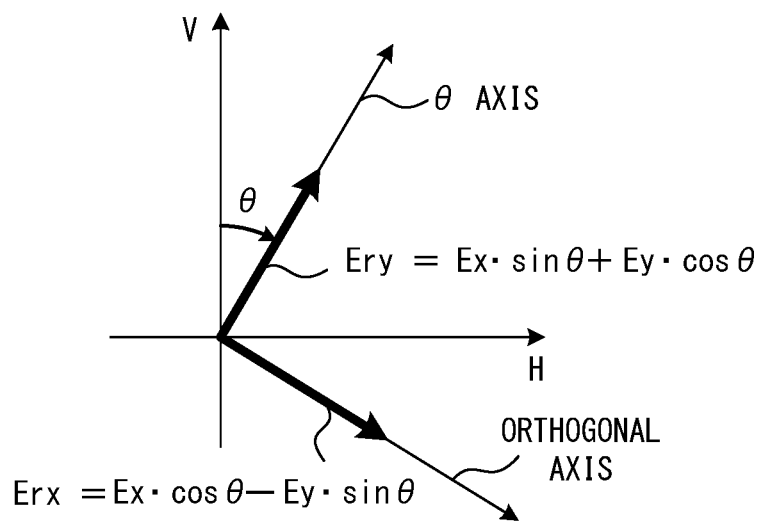
Figure 11C:
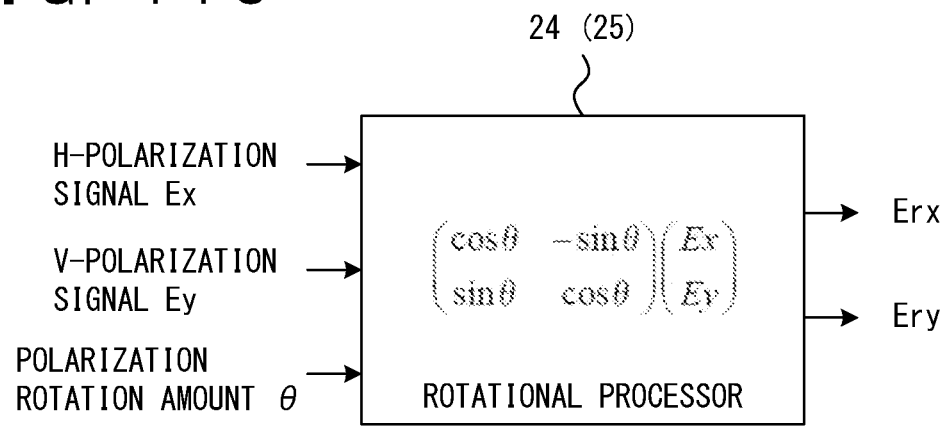

FIGS. 11A-11C are explanatory diagrams for a rotation of polarization of an optical signal. In this example, the direction of a polarization is represented using a polarization plane coordinate system formed from a H axis corresponding to a horizontal polarization and a V axis corresponding to a vertical polarization. Note that the horizontal polarization H and the vertical polarization V are orthogonal to each other.

The monitor signal rotator 24 rotates a monitor signal in the coordinate system depicted in FIG. 11A. Assume that a pair of polarization components extracted by the adaptive equalizer 13b (Ex, Ey) are in the state depicted in FIG. 11A. The monitor signal rotator 24 rotates the polarization of the monitor signal by θ. In this case, a signal Erx and a signal Ery are obtained, as indicated in FIG. 11B.

The signal Ery is represented by a component obtained by projecting the polarization component Ex onto a θ axis and a component obtained by projecting the polarization component Ey onto the θ axis. The signal Erx is represented by a component obtained by projecting the polarization component Ex onto an orthogonal axis and a component obtained by projecting the polarization component Ey onto the orthogonal axis.

The monitor signal rotator 24 performs rotational processing operations as depicted in FIG. 11C. In particular, the H-polarization signal Ex and the V-polarization signal Ey are multiplied by a rotating matrix. The rotating matrix includes a parameter θ indicating a polarization rotation amount. The H-polarization signal Ex, the V-polarization signal Ey, and the parameter θ may temporarily be written to a register. In this case, for each symbol, the monitor signal rotator 24 reads Ex, Ey, and θ from the register and performs the rotational processing operations. As a result, the signal Erx and the signal Ery indicated in FIG. 11B are obtained.

The configuration of, and the processing performed by, the reference signal rotator 25 are substantially the same as the configuration of, and the processing performed by, the monitor signal rotator 24. Thus, the reference signal rotator 25 performs a rotational processing operation for a reference signal obtained by the transmission waveform reconfiguration unit 23.

The rotation amount controller 26 designates a rotation amount for the monitor signal rotator 24 and the reference signal rotator 25. For example, the rotation amount controller 26 may have a plurality of rotation amount values that fall within a range from zero degrees to 180 degrees (0, 10, 20, . . . , 180). The rotation amount controller 26 may sequentially assign these values to the monitor signal rotator 24 and the reference signal rotator 25. Alternatively, when the rotation amount has a constant change step Δθ, the rotation amount controller 26 may designate a parameter n (n=0, 1, 2, . . . ) for the monitor signal rotator 24 and the reference signal rotator 25. In this case, the monitor signal rotator 24 and the reference signal rotator 25 respectively perform a rotational processing operation of nΔθ.

The characteristics detector 27 calculates a correlation value between a monitor signal and a reference signal by using the method described above by referring to FIGS. 3-5. The monitor signal indicates the electric field intensity and the optical phase of a received optical signal. However, dispersion and a nonlinear distortion in the monitor signal are compensated for. The reference signal indicates the electric field intensity and the optical phase of an optical signal transmitted from the transmitter node 100. As described above, the correlation value is dependent on the power of the optical signal. In this example, the characteristics detector 27 is designed such that a correlation value is large when optical power is large. The characteristics detector 27 detects the power of the optical signal by calculating the correlation value between the monitor signal and the reference signal.

The characteristics detector 27 detects the powers of an optical signal at a plurality of positions on a transmission line. As described above by referring to FIGS. 3-4, for example, a position on the transmission line may be designated by a combination of dispersion compensation amounts CD1 and CD2. In addition, the characteristics detector 27 detects the power of an optical signal for each of the rotation amounts θ controlled by the rotation amount controller 26. Hence, the power of an optical signal is detected for each position and for each rotation amount. In addition, the characteristics detector 27 detects the power of an optical signal for each polarization component. For example, the optical power(s) of the polarization component(s) in the θ-axis direction or(and) the orthogonal-axis direction depicted in FIG. 11B may be detected.

According to an optical power detected for each position and for each rotation amount, the position detector 28 decides whether a polarization dependent loss has occurred on the transmission line. When a polarization dependent loss has occurred, the position detector 28 detects a position at which the polarization dependent loss has occurred.

FIG. 12 is a flowchart illustrating an example of a method for detecting a position at which a polarization dependent loss has occurred. The processes of this flowchart are performed mainly by the monitor signal rotator 24, the reference signal rotator 25, the rotation amount controller 26, the characteristics detector 27, and the position detector 28. The processes of this flowchart are performed for each of symbols.

In S11, a monitor signal and a reference signal for a target symbol are input. The monitor signal, which indicates the electric field of a received optical signal, is stored in the monitor signal storage 21. The reference signal, which indicates the electric field of a transmission optical signal of the transmitter node 100, is generated by the transmission waveform reconfiguration unit 23.

In S12, the rotation amount controller 26 determines a rotation amount θi. For example, rotation amounts θi may be set in increments of 10 degrees within a range from zero degrees to 180 degrees. In this case, for example, the initial value of the rotation amount θi may be zero, and the rotation amount θi may be incremented by 10 degrees every time S12-S15 are performed.

In S13, the monitor signal rotator 24 rotates the monitor signal by θi on a polarization plane coordinate system. The monitor signal is represented by a pair of polarization components orthogonal to each other (a H-polarization signal and a V-polarization signal). In this example, the H-polarization signal and the V-polarization signal of the monitor signal are respectively Ex and Ey, as depicted in FIG. 11A. In this case, output signals Erx and Ery of the monitor signal rotator 24 are expressed by formula 4. Each of Ex, Ey, Erx, and Ery is a complex number indicating an electric field intensity and an optical phase.

$$\begin{pmatrix} Erx \\ Ery \end{pmatrix} = \begin{pmatrix} \cos\theta i & -\sin\theta i \\ \sin\theta i & \cos\theta i \end{pmatrix} \begin{pmatrix} Ex \\ Ey \end{pmatrix} \quad (4)$$

Likewise, the reference signal rotator 25 rotates the reference signal by θi on the polarization plane coordinate system. Formula 5 expresses output signals Esrx and Esry of the reference signal rotator 25, where Esx and Esy are respectively the H-polarization signal and the V-polarization signal of the reference signal. Each of Esx, Esy, Esrx, and Esry is a complex number indicating an electric field intensity and an optical phase.

$$\begin{pmatrix} Esrx \\ Esry \end{pmatrix} = \begin{pmatrix} \cos\theta i & -\sin\theta i \\ \sin\theta i & \cos\theta i \end{pmatrix} \begin{pmatrix} Esx \\ Esy \end{pmatrix} \quad (5)$$

In S14, the characteristics detector 27 calculates the correlation value between the monitor signal and the reference signal for various positions on the transmission line between the transmitter node 100 and the optical network device 1. As described above, a position on the transmission line is designated by a combination of dispersion compensation amounts CD1 and CD2. The correlation values each indicate the power of the optical signal at each position. Thus, the characteristics detector 27 calculates the powers of the optical signal at a plurality of positions on the transmission line. The characteristics detector 27 calculates the optical power of the polarization component in the θ-axis direction and/or the optical power of the polarization component in the orthogonal-axis direction. Accordingly, for a plurality of positions on the transmission line, the characteristics detector 27 calculates the power of the optical signal in the θ-axis direction and/or the power of the optical signal in the orthogonal-axis direction. Note that a position for which the power of an optical signal is calculated may hereinafter be referred to as a "measurement position."

Figures 13A, 13B:
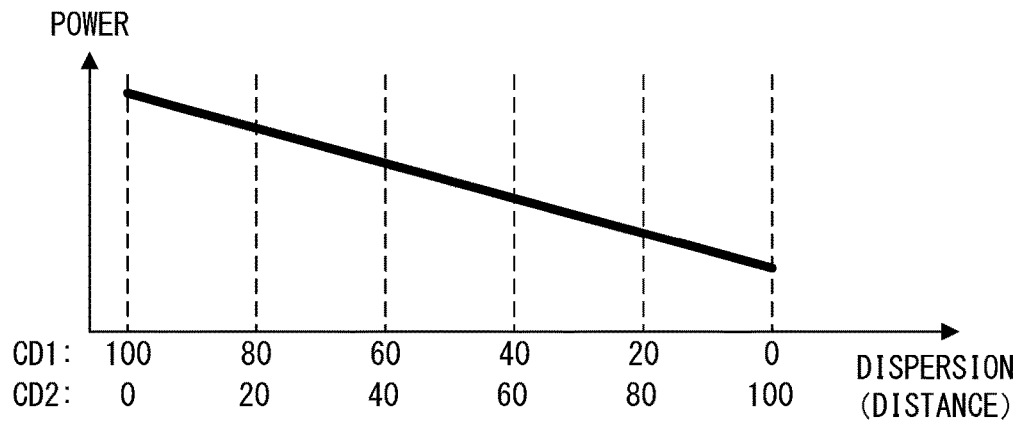
FIGS. 13A and 13B illustrate an example of a method for creating a power profile.

Assume, for example, that the transmitter node 100 and the optical network device 1 are connected by an optical fiber having a length of 5 km, as depicted in FIG. 13A. The optical fiber has a chromatic dispersion of 20 ps/nm/km. Accordingly, the total chromatic dispersion of the transmission line between the transmitter node 100 and the optical network device 1 is 100 ps/nm.

The characteristics detector 27 calculates correlation values for positions at distances of 0 km (i.e., transmission end), 1 km, 2 km, 3 km, 4 km, and 5 km (i.e., reception end) with respect to the transmitter node 100. Each position on the transmission line is expressed by a combination of chromatic dispersions CD1 and CD2. For example, a position at a distance of 1 km from the transmitter node 100 toward the optical network device 1 may be expressed as "CD1=80, CD2=20." A position at a distance of 2 km from the transmitter node 100 toward the optical network device 1 is expressed as "CD1=60, CD2=40." As a result, when, for example, the rotation amount determined by the rotation amount controller 26 is "θ0," the characteristics detector 27 obtains correlation values C00-050 indicated in FIG. 13B. C00, C10, C20, C30, C40, and C50 respectively indicate correlation values (i.e., powers of an optical signal) that correspond to positions at distances of 0 km, 1 km, 2 km, 3 km, 4 km, and 5 km from the transmitter node 100 toward the network device 1 when the rotation amount is θ0. Note that the power of an optical signal on the transmission line in the absence of a polarization dependent loss will gradually decrease with the transmission distance, as depicted in FIG. 13A. In this way, a power profile is created for one rotation amount θi in S14.

In S15, the characteristics detector 27 decides whether power profiles have been created for all the rotation amounts (θ0-θN). When a rotation amount for which a power profile has not been created remains, the process of the characteristics detector 27 returns to S12. Hence, the characteristics detector 27 creates a power profile for each of the rotation amounts. Thus, optical powers that correspond to a plurality of measurement positions on the transmission line are obtained for each of the rotation amounts θ0-θ4, as depicted in FIG. 13B. In this case, the characteristics detector 27 creates a power profile for the polarization component in the θ-axis direction and/or a power profile for the polarization component in the orthogonal-axis direction. Note that in the example depicted FIG. 13B, the constant N used in the flowchart is 4.

In S21, the position detector 28 calculates a difference (dk) between a largest power value and a smallest power value for a measurement position k. For example, when the process of S21 is performed for a position X2, the position detector 28 obtains a largest value and a smallest value from the correlation values C20-C24. The position detector 28 calculates the difference between the largest value and the smallest value. Thus, a power difference dk indicating the difference between the largest power value and the smallest power value is calculated. Note that the difference between largest power value and smallest power value calculated in S21 (or the difference between largest value and smallest value obtained from a plurality of correlation values) is an example of a variation in an evaluation value.

If a polarization dependent loss has occurred on the transmission side of the position X2, the power of an optical signal detected at the position X2 may be decreased depending on the angle of polarization of the optical signal. For example, when the direction of the polarization of one optical signal of a pair of optical signals forming a polarization multiplexed optical signal matches or substantially matches a direction in which a polarization dependent loss occurs, the power of the optical signal may decrease. Thus, when a polarization dependent loss has occurred, rotating electric-field-information signals indicating a monitor signal and a reference signal will increase a variation in the power of the optical signal detected at the position X2. Hence, when the correlation values C20-C24 indicating powers of the optical signal exhibit large variations while rotating the monitor signal and the reference signal, a polarization dependent loss is inferred to have occurred on the transmission side of the position X2. Accordingly, when the difference between the largest and smallest of the correlation values C20-C24 is large, a polarization dependent loss is inferred to have occurred on the transmission side of the position X2.

When one signal (e.g., X polarization signal) among a pair of signals forming a polarization multiplexed optical signal is configured in the PDL axis direction and the other signal (e.g., Y polarization signal) is configured in the orthogonal axis direction, the difference between the maximum and the minimum of the correlation value that is obtained for each measurement position when the rotation amount of the rotational processing operation is changed within a specified range corresponds to the power difference between these two signals. Thus, the power difference calculated in S21 corresponds to a power difference between polarizations that occurs due to a polarization dependent loss.

In S22, the position detector 28 calculates a difference (ddk) between the power difference dk calculated for the measurement position k and a power difference dk-1 obtained in advance for a measurement position k-1. The measurement position k-1 indicates a measurement position located on the transmission side of, and adjacent to, the measurement position k.

S23 is provided to perform S21-S22 for all of the measurement positions. When the processes of S21-S22 are finished for all of the measurement positions, the process of the position detector 28 shifts to S24.

In S24, the position detector 28 detects a measurement position k with a difference ddk greater than a threshold. When a difference ddk calculated for a measurement position k is greater than the threshold, the position detector 28 determines that a polarization dependent loss between the measurement position k and a measurement position k-1 has occurred. Then, in S25, the position detector 28 outputs information indicating a position at which a polarization dependent loss is inferred to have occurred (actually, information indicating a range within which the polarization dependent loss is inferred to have occurred). For example, the position information output from the position detector 28 may be stored in the server computer. In this case, a network administrator can inspect the state of the transmission line by using the server computer. When the difference ddk is less than the threshold, the position detector 28 determines that a polarization dependent loss has not occurred between a target measurement position and an adjacent measurement position. In this case, the position detector 28 may output information indicating that a polarization dependent loss has not occurred.

The threshold in S24 may be zero. However, when the threshold is zero (or a value close to zero), an incorrect decision result may be obtained due to noise or the like. Thus, in view of the noise or the like, a certain positive value may be preferably set as the threshold.

FIG. 14 illustrates an example of the position detector 28. The position detector 28 includes a power profile storage 28a, a plurality of difference calculators 28b (#0-#K), and a changing point detector 28c. The power profile storage 28a stores a power profile generated by the characteristics detector 27. As indicated in FIG. 13B, the power profile indicates optical power values (or correlation values) for combinations of positions and rotation amounts. The plurality of difference calculators 28b are provided in association with a plurality of measurement positions on a transmission line. Each of the difference calculators 28b obtains a plurality of optical power values for a corresponding measurement position and obtains the largest power value and the smallest power value among the plurality of optical power values. Each of the difference calculators 28b calculates a power difference indicating the difference between the largest power value and the smallest power value.

Note that the power difference calculated by each of the difference calculators 28b corresponds to a polarization dependent loss at a corresponding position. The process performed by each of the difference calculators 28b corresponds to S21 indicated in FIG. 12.

The changing point detector 28c sequentially arranges the power differences obtained by the difference calculators 28b (d1, d2, ... dN) according to transmission distances from the transmitter node 100. The changing point detector 28c detects a pair of positions with a change in power difference being larger than a threshold, among pairs of adjacent measurement positions. For example, in FIG. 13A, when a difference dd2 between a power difference d1 obtained for a position X1 (i.e., a PDL detected at the position X1) and a power difference d2 obtained for a position X2 (i.e., a PDL detected at the position X2) is larger than the threshold, the changing point detector 28c determines that a polarization dependent loss has occurred between the positions X1 and X2.

Figure 15A:
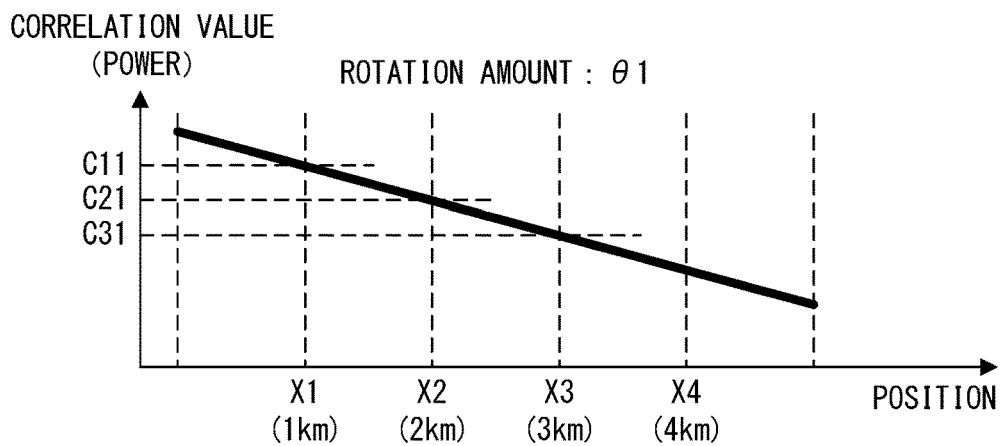
FIGS. 15A-15C illustrate an example of a method for detecting a position at which a polarization dependent loss has occurred.
Figure 15B:
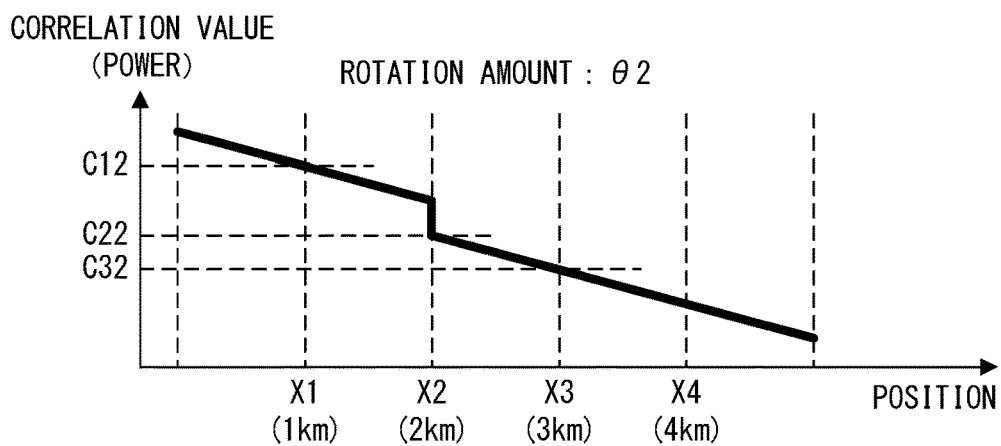
Figure 15C:
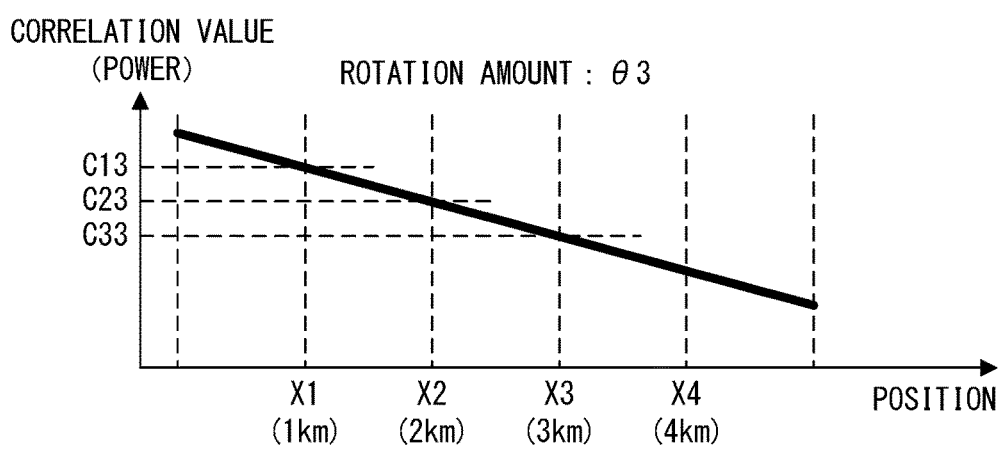

FIGS. 15A-15C illustrate an example of a method for detecting a position at which a polarization dependent loss has occurred. In this example, the polarization rotation amount of a monitor signal and a reference signal is θ1, θ2, or θ3. A correlation value obtained by the characteristics detector 27 may be referred to as a "power value."

FIG. 15A indicates power values C11-C31 calculated for positions X1-X3 when the rotation amount is θ1. Similarly, FIG. 15B indicates power values C12-C32 calculated for the positions X1-X3 when the rotation amount is θ2. FIG. 15C indicates power values C13-C33 calculated for the positions X1-X3 when the rotation amount is θ3. The position detector 28 decides whether a polarization dependent loss has occurred by using power values calculated for each of the measurement positions (X1-X3 in this example).

With respect to the position X1, the power values C11, C12, and C13 are respectively obtained for the rotation amounts θ1, θ2, and θ3. In this example, the power values C11, C12, and C13 are substantially equal. In this case, the difference between the largest power value and the smallest power value (i.e., power difference d1) is substantially zero, so it is decided that a polarization dependent loss has not occurred.

With respect to the position X2, the power values C21, C22, and C23 are respectively obtained for the rotation amounts θ1, θ2, and θ3. In this example, the power values C21 and C23 are substantially equal, but the power value C22 is smaller than the others. The difference between the largest power value and the smallest power value obtained for the position X2 (i.e., power difference d2) is larger than the power difference d1 obtained for the position X1. Hence, the power difference d2 obtained for the position X2 is larger than the power difference d1 obtained for the measurement position adjacent to, and located on the transmission side of, the position X2. Thus, the "position X2" is obtained in S24.

With respect to the position X3, the power values C31, C32, and C33 are respectively obtained for the rotation amounts θ1, θ2, and θ3. In this example, the power values C31 and C33 are substantially equal, but the power value C32 is smaller than the others. However, the difference between the largest power value and the smallest power value obtained for the position X3 (i.e., power difference d3) is substantially equal to the power difference d2 obtained for the position X2. Thus, the "position X3" is not obtained in S24. As a result, it is determined in the case depicted in FIGS. 15A-15C that a polarization dependent loss has occurred between the positions X1 and X2.

FIG. 16 illustrates another example of a method for detecting a position at which a polarization dependent loss has occurred. Also in this example, the transmitter node 100 and the optical network device 1 are connected by an optical fiber having a length of 5 km, as depicted in FIG. 13A. Results of measurement depicted in FIG. 16 are obtained. The values in FIG. 16 indicate correlation values obtained for combinations of positions and rotation amounts θ (or indicate optical powers of an optical signal). The values indicated in FIG. 16 may hereinafter be each referred to as an "evaluation value." The "difference" in FIG. 16 indicates the difference between the largest value and the smallest value among evaluation values calculated for each measurement position.

For the position X0, the largest evaluation value and the smallest evaluation value are respectively "81" and "80", and the difference d0 is "1." For the position X1, the largest evaluation value and the smallest evaluation value are respectively "71" and "69", and the difference d1 is "2." In this example, the threshold in S24 is "5." Thus, the result of subtracting the difference d0 from the difference d1 is smaller than the threshold. Accordingly, the position detector 28 determines that a polarization dependent loss has not occurred on the transmission side of the position X1.

For the position X2, the largest evaluation value and the smallest evaluation value are respectively "60" and "50," and the difference d2 is "10." The result of subtracting the difference d1 from the difference d2 is "8," which is larger than the threshold. Accordingly, in this case, the position detector 28 determines that a polarization dependent loss has occurred between the positions X1 and X2.

For the position X3, the largest evaluation value and the smallest evaluation value are respectively "50" and "40", and the difference d3 is "10." However, the result of subtracting the difference d2 from the difference d3 is "0," which is smaller than the threshold. Accordingly, in this case, the position detector 28 determines that a polarization dependent loss has not occurred between the positions X2 and X3. Results of decisions obtained for the positions X4 and X5 will be similar to that for the position X3.

As described above, the optical network device 1 can detect a position at which a polarization dependent loss has occurred by analyzing electric field information of a received optical signal. Hence, effort and/or time needed to detect a position at which a polarization dependent loss has occurred can be reduced.

Using the method indicated in FIG. 5, a position at which a polarization dependent loss has occurred can also be detected by analyzing electric field information of a received optical signal. However, in the method indicated in FIG. 5, the transmitter node 200 actually rotates the polarization of an optical signal. In addition, the optical network device 300 estimates a polarization dependent loss by acquiring the electric field information of a received optical signal while the rotation amount of polarization of the optical signal is maintained at a constant value. Thus, the method depicted in FIG. 5 involves a long time to detect a position at which a polarization dependent loss has occurred. By contrast, in embodiments of the present invention, a polarization dependent loss can be detected by performing rotational transformation for the electric field information of a received optical signal, without actually rotating the polarization of the optical signal. Hence, embodiments of the present invention can make the time required to detect a position of occurrence of a polarization dependent loss shorter than that in the method indicated in FIG. 5.

Figure 17:
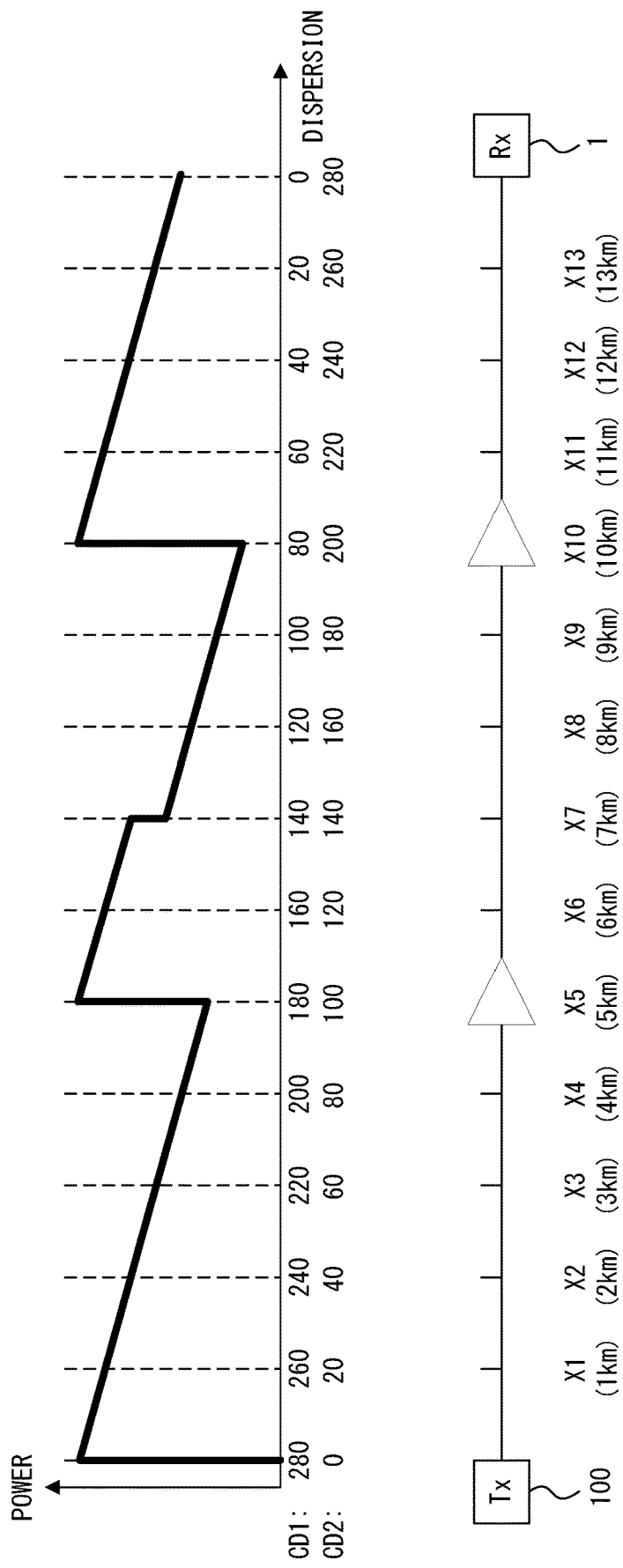
FIG. 17 illustrates an example of an optical transmission system formed from a plurality of spans.

FIG. 17 illustrates an example of an optical transmission system formed from a plurality of spans. In this example, the length of a transmission line between a transmitter node (Tx) 100 and an optical network device (Rx) 1 is 14 km, and an optical amplifier is implemented at each of positions X5 and X10. A local polarization dependent loss has occurred between positions X6 and X7.

The optical network device 1 measures an optical power for each measurement position (X1-X14) based on the electric field information of a received optical signal. According to a change in power between adjacent measurement positions, the optical network device 1 estimates a position at which a polarization dependent loss has occurred. Thus, irrespective of the number of spans of the optical transmission system, a position at which a polarization dependent loss has occurred can be estimated using the same method.

Figure 18:
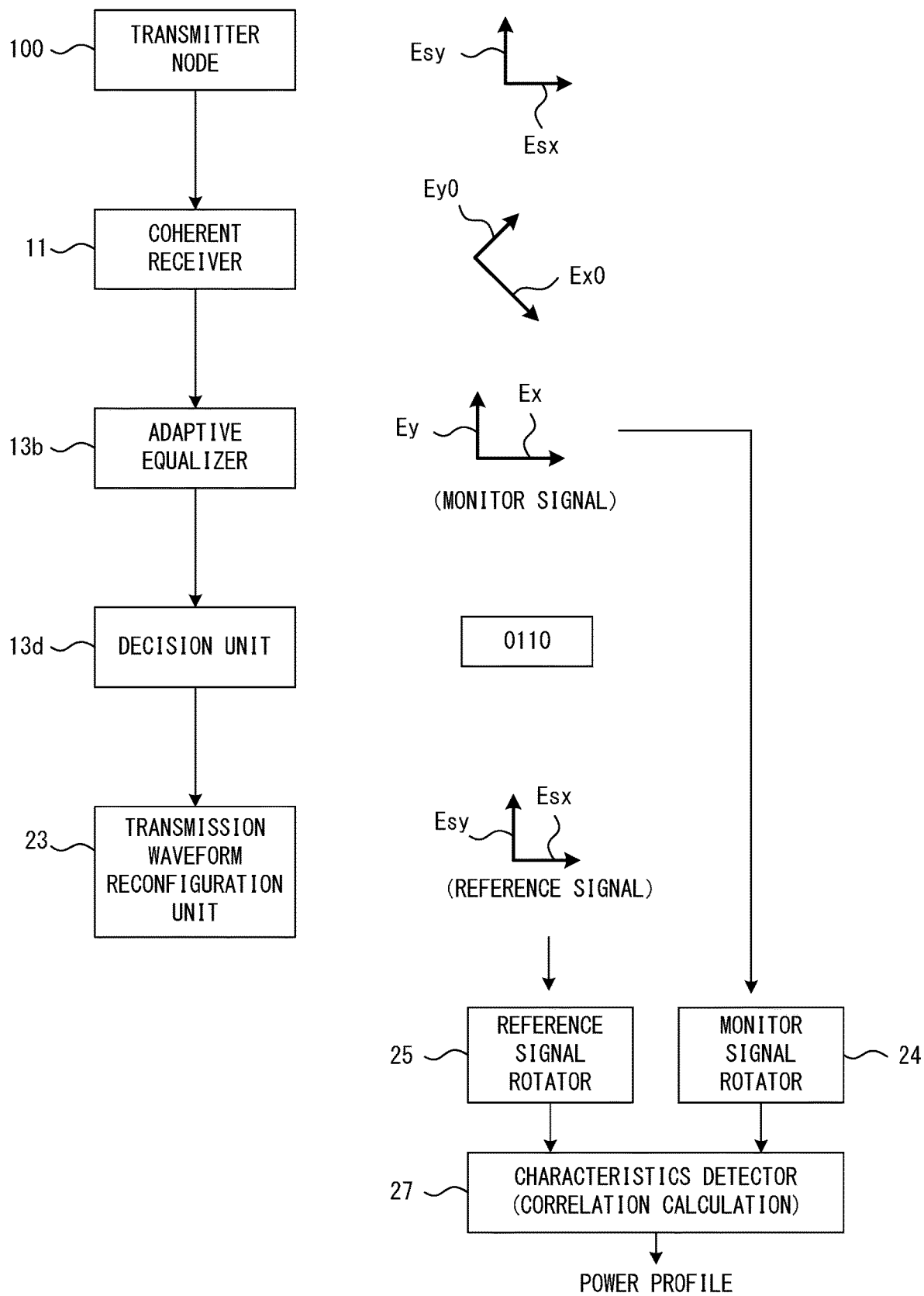
FIG. 18 schematically illustrates processes performed by an optical network device.

FIG. 18 schematically illustrates processes performed by the optical network device 1. As described above, the transmitter node 100 generates and transmits a polarization multiplexed optical signal. The electric field of the polarization multiplexed optical signal is expressed by Esx and Esy. Esx and Esy are orthogonal to each other.

The polarization of the polarization multiplexed optical signal rotates in an optical transmission line. The polarization multiplexed optical signal is affected by a polarization dependent loss in the transmission line. The coherent receiver 11 of the optical network device 1 generates electric field information Ex0 and electric field information Ey0.

The adaptive equalizer 13b corrects an output signal of the coherent receiver 11 so as to separate an electric-field-information signal indicating the electric field of a polarization multiplexed optical signal into a first polarization component Ex and a second polarization component Ey orthogonal to each other. In this example, Ex and/or Ey are used as a monitor signal.

The decision unit 13d recovers transmission data according to an output signal of the adaptive equalizer 13b. The transmission waveform reconfiguration unit 23 generates electric field information by mapping the recovered transmission data. The electric field information is substantially the same as the electric field of the polarization multiplexed optical signal generated by the transmitter node 100. Thus, electric field information Esx and electric field information Esy are reconfigured. In this example, the reconfigured Esx and/or Esy are used as a reference signal.

The monitor signal rotator 24 rotates the monitor signal (Ex, Ey) by $\theta$ about the origin of a polarization plane coordinate system so as to generate electric field information Erx and electric field information Ery. Likewise, the reference signal rotator 25 rotates the reference signal (Esx, Esy) by $\theta$ about the origin of the polarization plane coordinate system so as to generate electric field information Esrx and electric field information Esry. The rotation amount $\theta$ is designated by the rotation amount controller 26. The characteristics detector 27 calculates an optical power for each rotation amount $\theta$ by calculating a correlation between the monitor signal (Erx, Ery) after rotational transformation and the reference signal (Esrx, Esry) after rotational transformation. The characteristics detector 27 may calculate the optical power of the X polarization signal by calculating a correlation between the polarization component Erx of the monitor signal after rotational transformation and the polarization component Esrx of the reference signal after rotational transformation. The characteristics detector 27 may calculate the optical power of the Y polarization signal by calculating a correlation between the polarization component Ery of the monitor signal after rotational transformation and the polarization component Esry of the reference signal after rotational transformation. In this case, the optical powers are calculated for each of a plurality of measurement positions on the transmission line. As a result, a power profile is created for each rotation amount $\theta$. More specifically, for each of the X polarization signal and the Y polarization signal, a power profile is created for each rotation amount $\theta$.

The flowchart depicted in FIG. 12 is an example, and the present invention is not limited to this procedure. Although a polarization dependent loss is detected according to the difference between a largest power value and a smallest power value in the flowchart depicted in FIG. 12, the polarization dependent loss may be detected according to the ratio between the largest power value and the smallest power value. Alternatively, the difference between the optical power of the X polarization signal and the optical power of the Y polarization signal may be monitored.

Although the flowchart depicted in FIG. 12 is performed for one symbol, the present invention is not limited to this method. In particular, when noise on the transmission line is considered, it may be preferable to calculate correlation values (i.e., optical powers) for a plurality of symbols and detect a position at which a polarization dependent loss has occurred according to the average of the calculated values.

In addition, in the configuration depicted in FIG. 9, the monitor signal indicates the electric field of an optical signal for which dispersion has been compensated for by the fixed equalizer 13a (and the adaptive equalizer 13b). Meanwhile, the characteristics detector 27 designates a position on the transmission line by using dispersion added to a received optical signal. Thus, in the optical network device 1, a function for adding dispersion compensated for by the fixed equalizer 13a may be provided on the input side or the output side of the monitor signal rotator 24.

The digital signal processor 13, the monitor signal rotator 24, the reference signal rotator 25, the rotation amount controller 26, the characteristics detector 27, and the position detector 28 may be implemented by one or more processors. In this case, a program describing the functions of the digital signal processor 13, the monitor signal rotator 24, the reference signal rotator 25, the rotation amount controller 26, the characteristics detector 27, and the position detector 28 is stored in a memory (not illustrated). A processor executes the program to provide the functions of the digital signal processor 13, the monitor signal rotator 24, the reference signal rotator 25, the rotation amount controller 26, the characteristics detector 27, and the position detector 28. Alternatively, these functions may be implemented by an ASIC (Application Specific Integrated Circuit) or an FPGA (Field Programmable Gate Array). In addition, these functions may be implemented by a combination of software and a hardware circuit.

Variations

FIG. 19 illustrates a first variation of an optical network device in accordance with embodiments of the present invention. Note that the coherent receiver 11 and the digital signal processor 13 depicted in FIG. 9 are omitted in FIG. 19.

An optical network device 1B includes a plurality of calculators 30 (#1-#N). Each of the calculators 30 includes a monitor signal rotator 24, a reference signal rotator 25, and a characteristics detector 27. The monitor signal rotator 24, the reference signal rotator 25, and the characteristics detector 27 in FIG. 19 are substantially the same as those in FIG. 9. Thus, the calculator 30 performs rotational transformation for a monitor signal and a reference signal. The calculator 30 calculates an optical power for each measurement position by calculating a correlation value between the monitor signal and reference signal after rotational transformation.

The calculator 30 is provided for each rotation amount in rotational transformation. For example, a calculator 30 #1 may perform a transformation with a rotation amount θ1, and a calculator 30 #2 may perform a transformation with a rotation amount θ2. Thus, when an optical power is calculated every 10 degrees within a range from zero degrees to 180 degrees, 19 calculators 30 are implemented in parallel. In this regard, a majority of the loads pertaining to the processes for detecting a position at which a polarization dependent loss has occurred are loads pertaining to the process in which the characteristics detector creates a power profile. Accordingly, the operation time can be shortened to about one N-th by implementing N calculators 30 in parallel. For example, in the optical network device 1B, the plurality of calculators 30 may perform the processes of S12-S14 in parallel. The plurality of calculators 30 may be implemented by allocating a CPU core to each of the calculators 30. The rotation amounts θ of the calculators 30 are determined in advance, so the optical network device 1B does not need to include the rotation amount controller 26.

Figure 20:
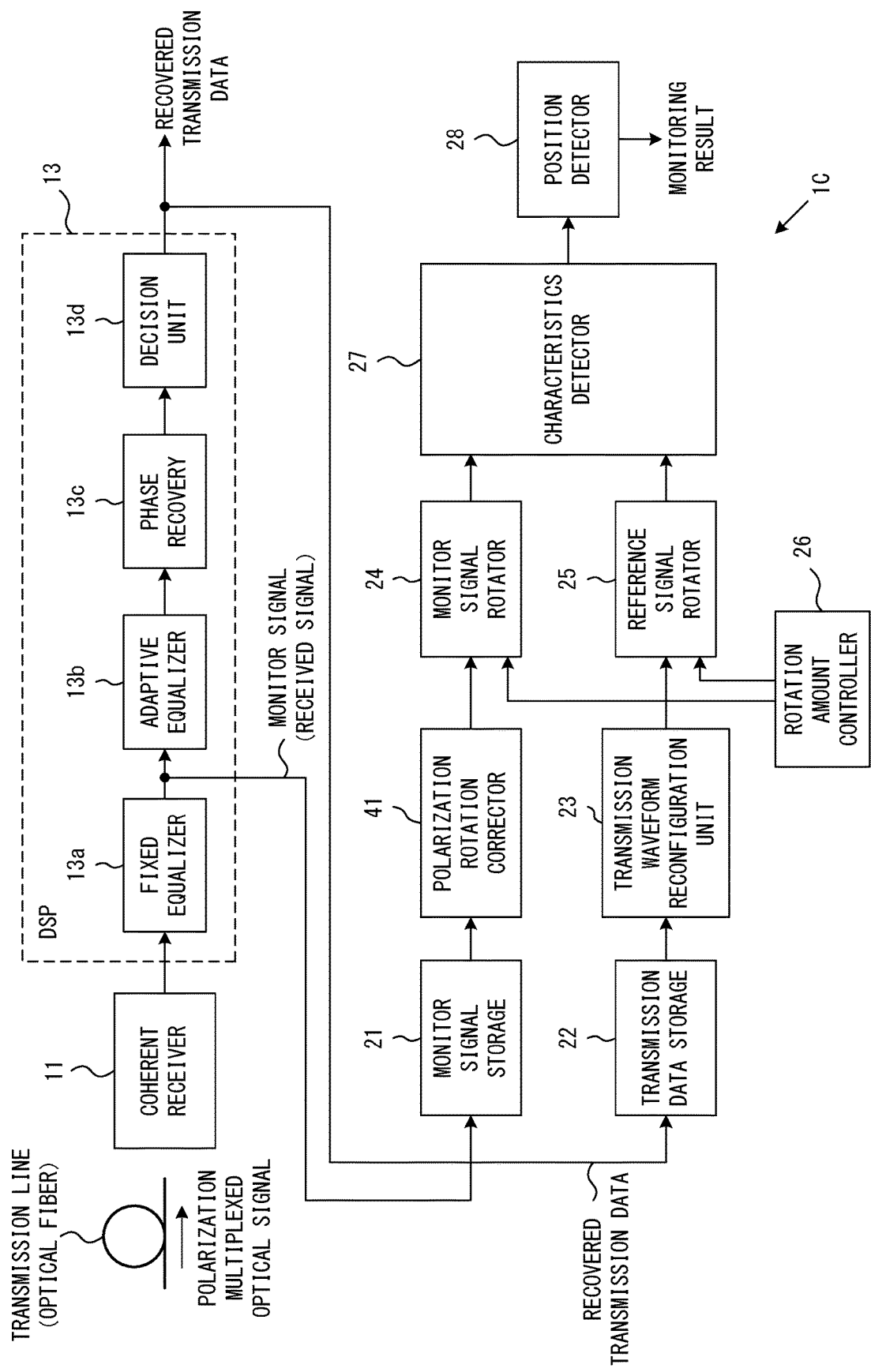
FIG. 20 illustrates a second variation of an optical network device in accordance with embodiments of the present invention.

FIG. 20 illustrates a second variation of an optical network device in accordance with embodiments of the present invention. In the optical network device 1 depicted in FIG. 9, an output signal of the adaptive equalizer 13b is used as a monitor signal. By contrast, in the optical network device 1C depicted in FIG. 20, an output signal of the fixed equalizer 13a is used as a monitor signal. Thus, an electric-field-information signal before being processed by the adaptive equalizer 13b is used as a monitor signal.

The adaptive equalizer 13b corrects a polarization rotation that occurs in the transmission line. Thus, in the second variation, a monitor signal for which a polarization rotation has not been corrected is generated. Accordingly, the optical network device 1C includes a polarization rotation corrector 41. The polarization rotation corrector 41 corrects, for a monitor signal, a polarization rotation that has occurred in the transmission line. In this case, the polarization rotation corrector 41 may obtain a parameter used by the adaptive equalizer 13b and correct the polarization rotation according to the parameter. For example, when the adaptive equalizer 13b is implemented by a digital filter, a parameter indicating a correction amount for a polarization rotation may correspond to the tap coefficients of the digital filter. In this case, the polarization rotation corrector 41 may obtain the tap coefficients from the adaptive equalizer 13b so as to correct the polarization rotation. Alternatively, the polarization rotation corrector 41 may calculate the correlation value between the monitor signal and a reference signal before the polarization rotation while rotating the polarization of the monitor signal little by little, and correct the polarization of the monitor signal with a rotation amount at which the correlation value is maximized.

In addition, the polarization rotation corrector 41 may determine a correction amount for a polarization rotation and report the determined correction amount to the monitor signal rotator 24. In this case, the monitor signal rotator 24 adds the correction amount determined by the polarization rotation corrector 41 to a rotation amount θ reported from the rotation amount controller 26 so as to perform a polarization rotational processing operation.

In the meantime, the adaptive equalizer 13b not only corrects a polarization rotation but also compensates for residual dispersion. In this case, nonlinear distortion components in an electric-field-information signal for a received optical signal are affected. Meanwhile, the characteristics detector 27 calculates an optical power at a desired position on the transmission line by using the nonlinear distortion components in the electric-field-information signal for the received optical signal. Thus, in the configuration depicted in FIG. 9, an optical power is calculated according to electric field information for which nonlinear distortion components have been corrected. By contrast, in the second variation depicted in FIG. 20, an optical power is calculated by using electric field information for which nonlinear distortion components have not been corrected. Accordingly, the second variation depicted in FIG. 20 can enhance the accuracy in calculation of an optical power in comparison with the configuration depicted in FIG. 9.

FIG. 21 illustrates a third variation of an optical network device in accordance with embodiments of the present invention. In the optical network device 1 depicted in FIG. 9, an output signal of the adaptive equalizer 13b is used as a monitor signal. By contrast, in the optical network device 1D depicted in FIG. 21, an output signal of the coherent receiver 11 is used as a monitor signal. Thus, an electricfield-information signal before being processed by the fixed equalizer 13*a* and the adaptive equalizer 13*b* is used as a monitor signal.

The optical network device 1D includes a polarization rotation corrector 41 and a dispersion compensator 42 in addition to the components depicted in FIG. 9. The polarization rotation corrector 41 in FIG. 21 is substantially the same as that in FIG. 20, and descriptions of this polarization rotation corrector are omitted herein.

The configuration and function of the dispersion compensator 42 are substantially the same as those of the fixed equalizer 13*a*. Thus, the fixed equalizer 13*a* and the dispersion compensator 42 each compensate for known wavelength-degraded components (e.g., chromatic dispersion of the transmission line). However, the fixed equalizer 13*a* needs to process sequential input signals in real time. Thus, the accuracy in the compensation process performed by the fixed equalizer 13*a* is not necessarily high. By contrast, the dispersion compensator 42 processes a signal stored in the monitor signal storage 21. In this regard, the process of monitoring a polarization dependent loss does not necessarily need to be performed in real time. Thus, the dispersion compensator 42 can extend a processing time per symbol in comparison with the fixed equalizer 13*a*. Hence, the dispersion compensator 42 can compensate for dispersion more accurately than the fixed equalizer 13*a*. For example, the frequency resolution of the dispersion compensator 42 may be enhanced, or the number of taps of the digital filter may be increased. Thus, an accurate monitor signal (i.e., electric field information of a received optical signal) is acquired so that a position at which a polarization dependent loss has occurred can be accurately detected.

Figure 22:
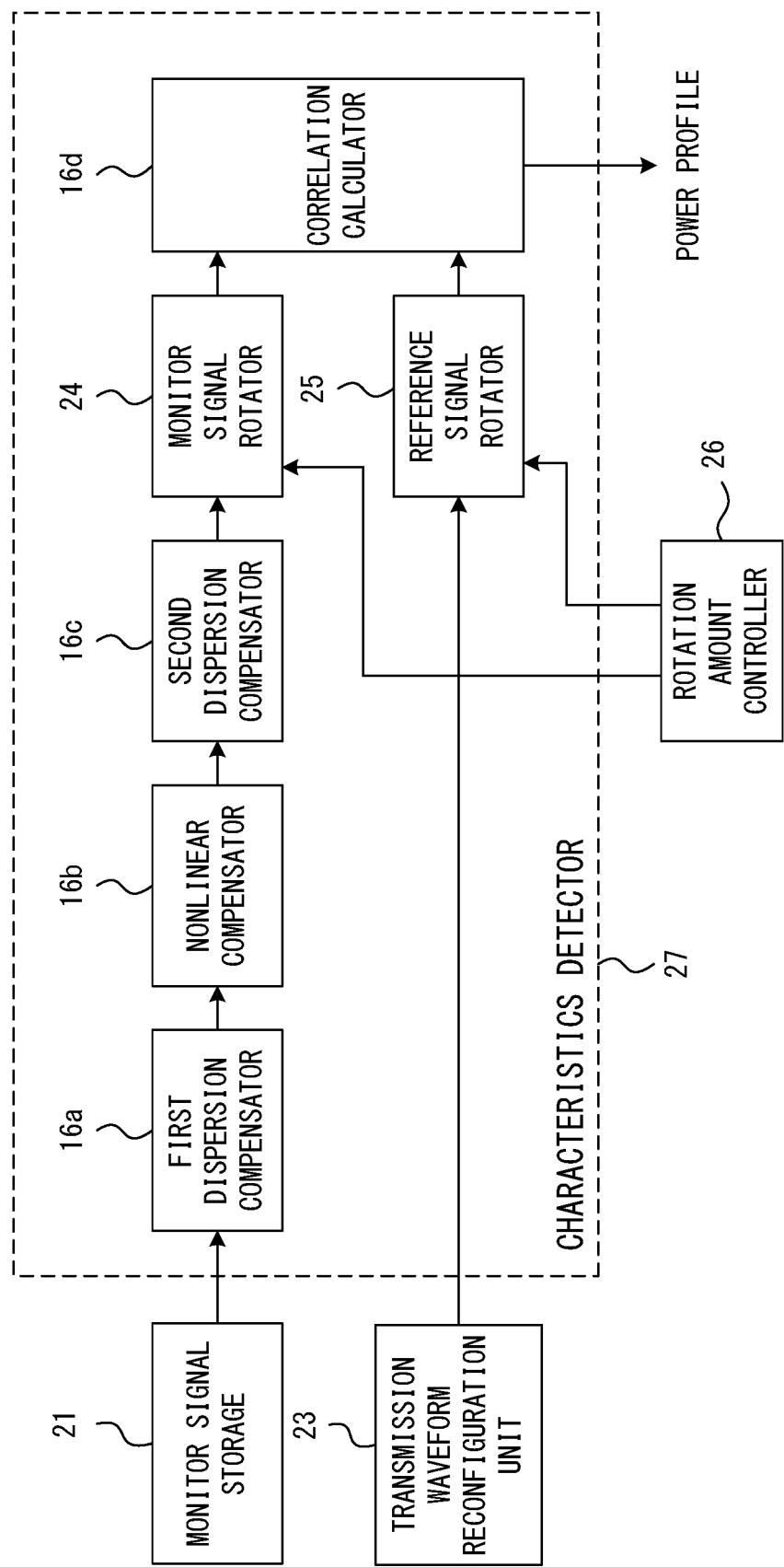
FIG. 22 illustrates a fourth variation of an optical network device in accordance with embodiments of the present invention.

FIG. 22 illustrates a fourth variation of an optical network device in accordance with embodiments of the present invention. FIG. 22 depicts only the characteristics detector and functions connected to the characteristics detector, and other circuits and functions are omitted.

In the fourth variation, the monitor signal rotator 24 and the reference signal rotator 25 are implemented in the characteristics detector 27. A monitor signal is compensated for by the first dispersion compensator 16*a*, the nonlinear compensator 16*b*, and the second dispersion compensator 16*c* and then processed by the monitor signal rotator 24. Note that a method that performs a compensation process and then performs a rotational processing operation and a method that performs the rotational processing operation and then performs the compensation process are mathematically equivalent to each other.

Second Embodiment

As described above, the optical network device in accordance with embodiments of the present invention creates the profile of power on an optical transmission line by using a received optical signal so as to detect a position at which the optical power suddenly changes, so that a position at which a polarization dependent loss has occurred can be estimated. However, an occurrence of a polarization dependent loss may not be accurately detected in accordance with the embodiment described above by referring to FIGS. 6-22 (which may be hereinafter referred to as the "first embodiment").

Figure 23A:
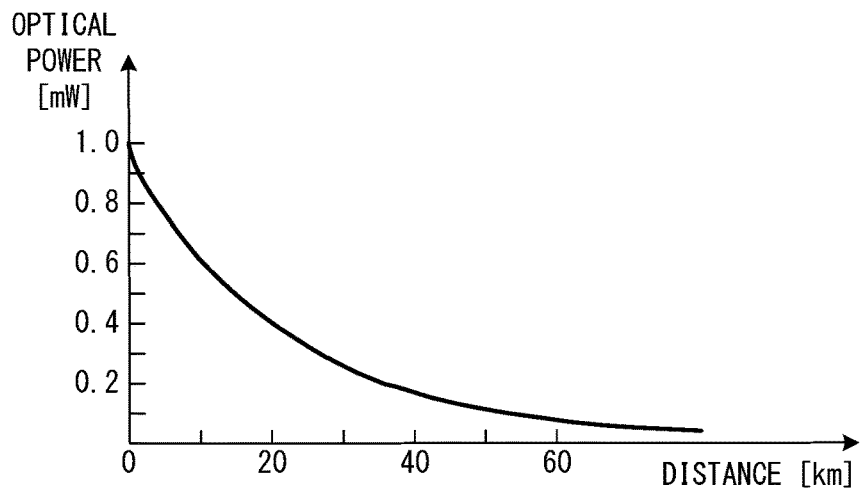
FIGS. 23A-23C illustrate examples of a change in the power of an optical signal output from a transmitter node.
Figure 23B:
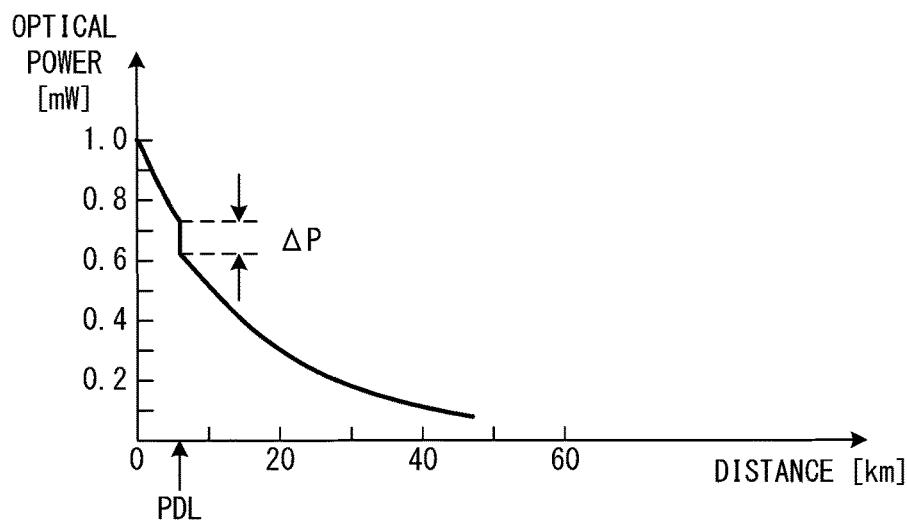
Figure 23C:
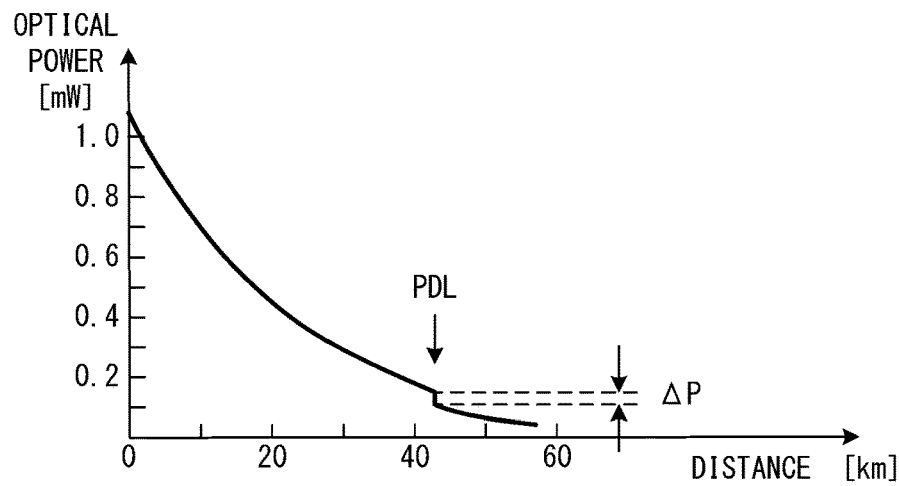

FIGS. 23A-23C illustrate examples of a change in the power of an optical signal output from a transmitter node. The power of the optical signal decreases as the transmission distance from the transmitter node increases. In the example depicted in FIG. 23A, an optical signal with an optical power of 1 mW is transmitted from the transmitter node and the optical power gradually decreases as the transmission distance increases.

When a polarization dependent loss has occurred on the optical transmission line, the optical power in the direction in which the loss occurs sharply decreases as depicted in FIG. 23B. In the first embodiment, the optical network device 1 calculates the power of an optical signal at specified spacings so as to detect a position at which the optical power suddenly changes, so that a position at which a polarization dependent loss has occurred can be estimated.

In a case where a polarization dependent loss occurs at a position at which the power of an optical signal is low, the amount of change in the optical power that results from the polarization dependent loss, i.e., change amount ΔP, is small as indicated in FIG. 23C. Here, the optical signal propagating through the optical transmission line includes noise. Thus, when the change amount ΔP of optical power that results from a polarization dependent loss is small, the optical network device 1 may not accurately detect the occurrence of the polarization dependent loss.

Meanwhile, in an optical transmission system that provides a long-distance transmission, one or more optical amplifiers are implemented between a transmitter node and a receiver node. In the example depicted in FIG. 24, two optical amplifiers are implemented between a transmitter node and a receiver node. The optical power has peaks at positions at which the optical amplifiers are implemented, and gradually decreases as the transmission distance from each of the optical amplifiers increases. A section extending from a peak of optical power provided by each optical amplifier to a peak of the optical power provided by an adjacent optical amplifier may hereinafter be referred to as a "span."

In this example, a polarization dependent loss occurs on the optical transmission line. In the example depicted in FIG. 24, the optical power of a X polarization signal and the optical power of a Y polarization signal are respectively 0.1 mW and 0.05 mW at the reception port of each optical amplifier. In this case, it is difficult to detect the polarization dependent loss since the power difference between polarizations is small.

However, when a polarization multiplexed optical signal is transmitted between the nodes, the optical amplifier typically amplifies a X polarization signal and a Y polarization signal without separating polarizations. As a result, for example, the optical power of the X polarization signal and the optical power of the Y polarization signal may be respectively amplified to 1 mW and 0.5 mW at the output port of the optical amplifier. In this case, the polarization dependent loss can be easily detected since the power difference between the polarizations is sufficiently large.

Accordingly, the optical network device in the second embodiment estimates an occurrence of a polarization dependent loss according to the state of light at a spot at which the power of an optical signal has a peak in the optical transmission system, in which one or more optical amplifiers are implemented between the transmitter node and the receiver node. According to this method, the granularity of detection of a polarization dependent loss is based on a unit of the span. In particular, it is detected which span among a plurality of spans a polarization dependent loss has occurred in.

Figure 25:
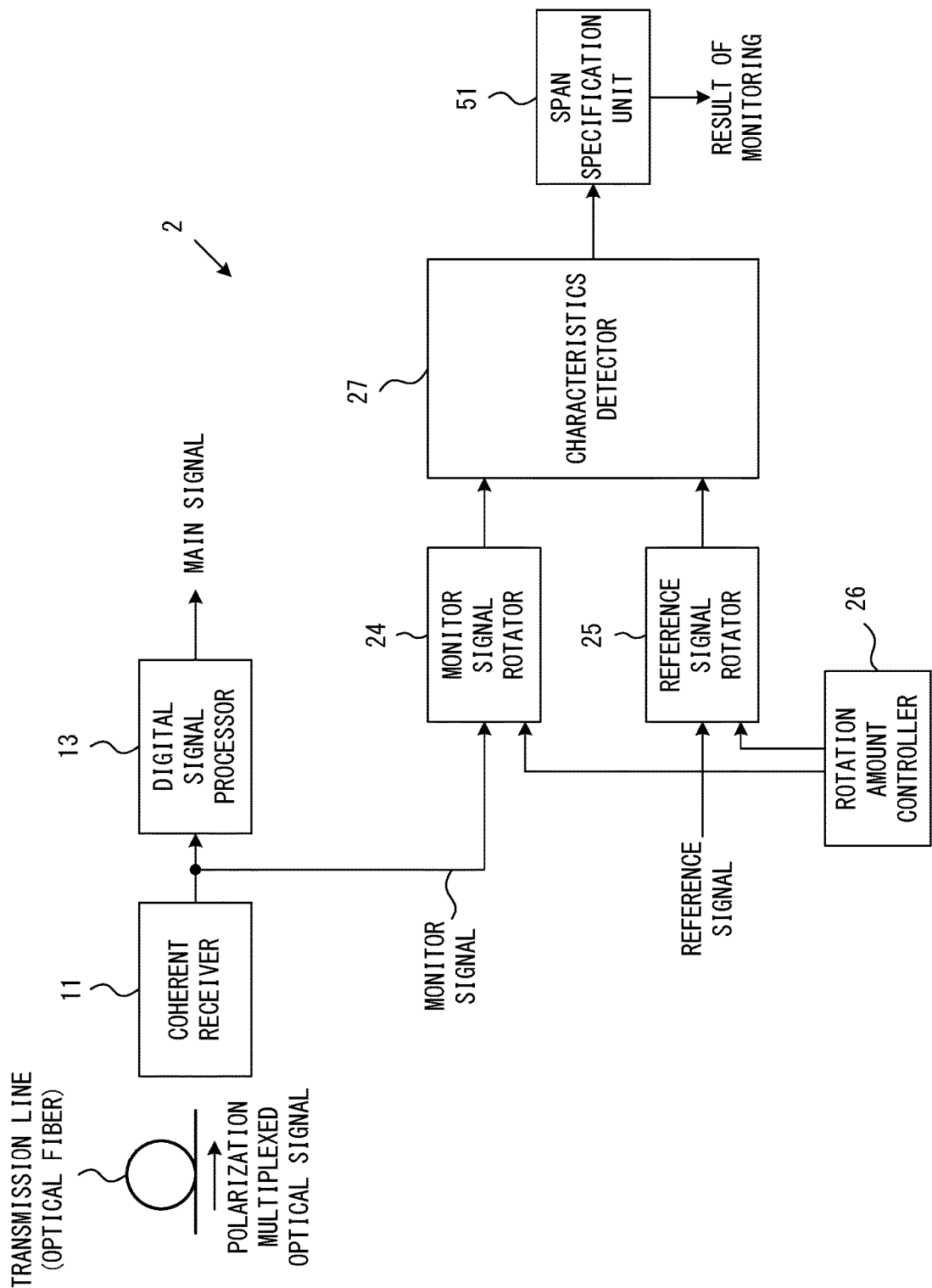
FIG. 25 illustrates an example of an optical network device in accordance with a second embodiment of the present invention.

FIG. 25 illustrates an example of the optical network device in accordance with the second embodiment of the present invention. The configuration of an optical network device 2 in accordance with the second embodiment of the present invention is almost the same as that of the optical network device 1 depicted in FIG. 8. In particular, the optical network device 2 includes the coherent receiver 11, the digital signal processor 13, the monitor signal rotator 24, the reference signal rotator 25, the rotation amount controller 26, and the characteristics detector 27. However, the optical network device 2 includes a span specification unit 51 in place of the position detector 28 depicted in FIG. 8.

According to a power profile created by the characteristics detector 27, the span specification unit 51 detects a position at which a polarization dependent loss has occurred, as with the position detector 28. Thus, the span specification unit 51 may be an example of or a variation of the position detector 28. However, the span specification unit 51 detects, on a span-by-span basis, a position at which a polarization dependent loss has occurred. Accordingly, the span specification unit 51 establishes a plurality of spans by dividing an optical transmission line according to the positions of optical amplifiers provided on the optical transmission line, and detects which span among the plurality of spans a polarization dependent loss has occurred in.

Figure 26:
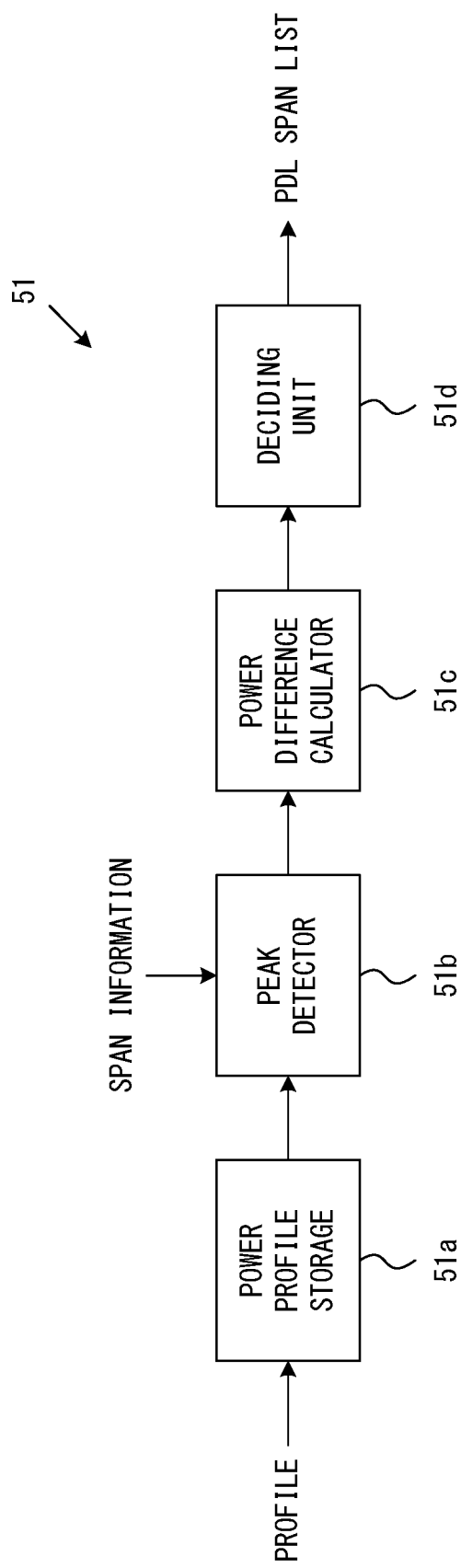
FIG. 26 illustrates an example of a span specification unit.

FIG. 26 illustrates an example of the span specification unit 51. In this example, the span specification unit 51 includes a power profile storage 51*a*, a peak detector 51*b*, a power difference calculator 51*c*, and a deciding unit 51*d*.

The power profile storage 51*a* stores a power profile created by the characteristics detector 27. According to the power profile, the peak detector 51*b* detects a position on an optical transmission line at which the power of an optical signal reaches a peak. This position may hereinafter be referred to as a "peak position." The power difference calculator 51*c* calculates, for each peak position, the difference between the power of a X polarization signal and the power of a Y polarization signal for each polarization rotation amount. In this case, the power difference calculator 51*c* may determine, for each peak position, the largest value among the differences between the powers of the X polarization signal and the powers of the Y polarization signal. When a power difference that is greater than a specified threshold is detected, the deciding unit 51*d* may estimate that a polarization dependent loss has occurred in a span that includes a peak position at which the power difference is detected.

FIG. 27 illustrates an example of spans and a power profile. As described above by referring to FIG. 3 or 13, a position on an optical transmission line (i.e., a transmission distance from a transmitter node) is indicated by a dispersion compensation amount. In this example, a position on the optical transmission line is indicated using a dispersion compensation amount CD2 that is compensated for by the second dispersion compensator 16*c* depicted in FIG. 1. For example, when the chromatic dispersion of an optical fiber is 20 ps/nm/km, "CD2=20" may correspond to "1 km."

In the example depicted in FIG. 27, optical amplifiers are implemented at positions corresponding to "CD2=100" and "CD=200." The power of an optical signal decreases as the transmission distance from the transmitter node increases and is amplified by an optical amplifier. The power of the optical signal decreases as the transmission distance from the optical amplifier increases.

As described above, a "span" indicates a section extending from a peak of optical power to an adjacent peak of the optical power. Accordingly, in this example, the section between the transmitter node and an optical amplifier A1 is a span S1, the section between the optical amplifier A1 and an optical amplifier A2 is a span S2, and the section between the optical amplifier A2 and the receiver node is a span S3.

FIG. 28 illustrates an example of a power profile for the optical transmission line indicated in FIG. 27. In this example, the optical powers of a X polarization signal and a Y polarization signal are estimated for each of measurement positions P0-P15. Each measurement position is actually indicated by dispersion compensation amounts CD1 and CD2. As described above by referring to FIGS. 1-4, the power of an optical signal is estimated from a correlation value indicating the correlation between a transmission signal (reference signal) and a received signal (monitor signal) after compensation of chromatic dispersion and nonlinear distortion. A power profile is created for each of a plurality of polarization rotation amounts. In this example, a power profile is created for each of 0°, 45°, 90°, and 135°. A polarization rotation amount corresponds to the rotation amount of a rotational processing operation performed by the monitor signal rotator 24 and the reference signal rotator 25.

For example, when the polarization rotation amount is zero, x00 to x0f may be obtained as estimated optical power values of the X polarization signal at the positions P0-P15, and y00 to y0f may be obtained as estimated optical power values of the Y polarization signal at the positions P0-P15. The same is true for the other polarization rotation amounts.

The following describes an operation performed by the span specification unit 51 when the power profiles indicated in FIG. 28 are created for the optical transmission line indicated in FIG. 27. The power profiles are created by the characteristics detector 27 and stored in the power profile storage 51*a*.

The peak detector 51*b* establishes a plurality of spans by dividing the optical transmission line according to span information. In the example indicated in FIG. 27, the transmitter node and the receiver node are respectively implemented at the positions P0 and P15. The optical amplifiers A1 and A2 are respectively implemented at the positions P5 and P10. Thus, the section P0-P5 corresponds to the span S1, the section P5-P10 corresponds to the span S2, and the section P10-P15 corresponds to the span S3. The optical network device 2 in accordance with embodiments of the present invention may be implemented in the receiver node.

In this example, span information indicates the positions at which the optical amplifiers A1 and A2 are implemented. For example, a network administrator may provide the span information to the optical network device 2.

Next, according to the power profiles, the peak detector 51*b* detects a position on the optical transmission line at which a peak of optical power appears. In this case, the peak detector 51*b* may detect, for each span, a position at which the maximum value of optical power is obtained. However, in this example, positions on the optical transmission line are estimated using a dispersion compensation amount and thus may have an error. Accordingly, the range within which a position at which the maximum value of optical power is obtained is searched for each span is preferably shifted toward the transmitter node with respect to the actual span. In the example depicted in FIG. 27, the search range corresponding to the span S1 is the positions P0-P4, the search range corresponding to the span S2 is the positions P4-P9, and the search range corresponding to the span S3 is the positions P9-P14. In this case, the peak detector 51*b* detects, for the span S1, a position among the positions P0-P4 at which the maximum value of optical power is obtained. In addition, a position among the positions P4-P9 at which the maximum value of optical power is obtained for the span S2 and a position among the positions P9-P14 at which the maximum value of optical power is obtained for the span S3.

The peak detector 51b may detect a peak position according to the optical power of a X polarization signal, may detect a peak position according to the optical power of a Y polarization signal, or may detect a peak position according to the sum of the optical powers of the X polarization signal and the Y polarization signal. In addition, the peak detector 51b can detect a peak position according to optical power obtained for any polarization rotation amount.

FIGS. 29A-30B illustrate examples of a change in a power profile with respect to a polarization rotational processing operation. FIGS. 29A, 29B, 30A, and 30B respectively indicate power profiles attained when polarization rotation amounts are 0°, 45°, 90°, and 135° for a polarization multiplexed optical signal transmitted through the optical transmission line indicated in FIG. 27. Solid lines indicate the power profile of a X polarization signal, and dashed lines indicate the power profile of a Y polarization signal. However, in each of FIGS. 29B and 30B, the two power profiles match each other over the entire section. In each of FIGS. 29A and 30B, the two power profiles match each other over the section extending from a position P0 to a position P7.

Figure 29A:
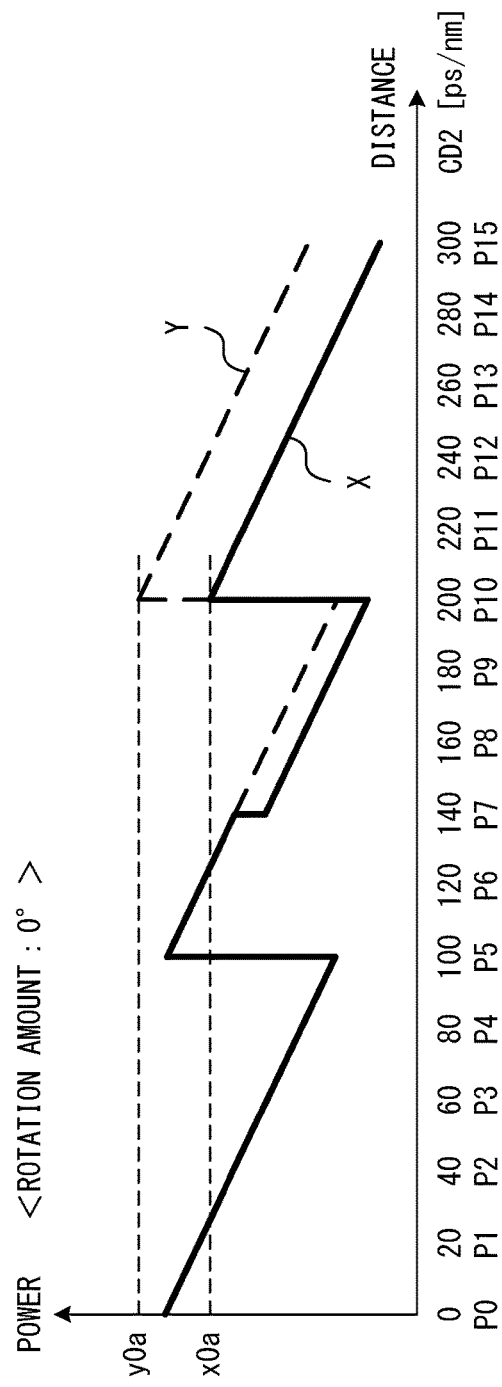

In this example, a polarization dependent loss has occurred between positions P6 and P7. Assume that the loss has occurred in the direction of a X polarization. In this case, when the monitor signal rotator 24 and the reference signal rotator 25 provide a polarization rotation amount of "0°," a loss occurs in the X polarization signal, as depicted in FIG. 29A. Meanwhile, no loss occurs in the Y polarization signal. Thus, there is a power difference between the X polarization signal and the Y polarization signal. In addition, the power difference increases when the optical signal is amplified by the optical amplifier at the position P10.

Figure 29B:
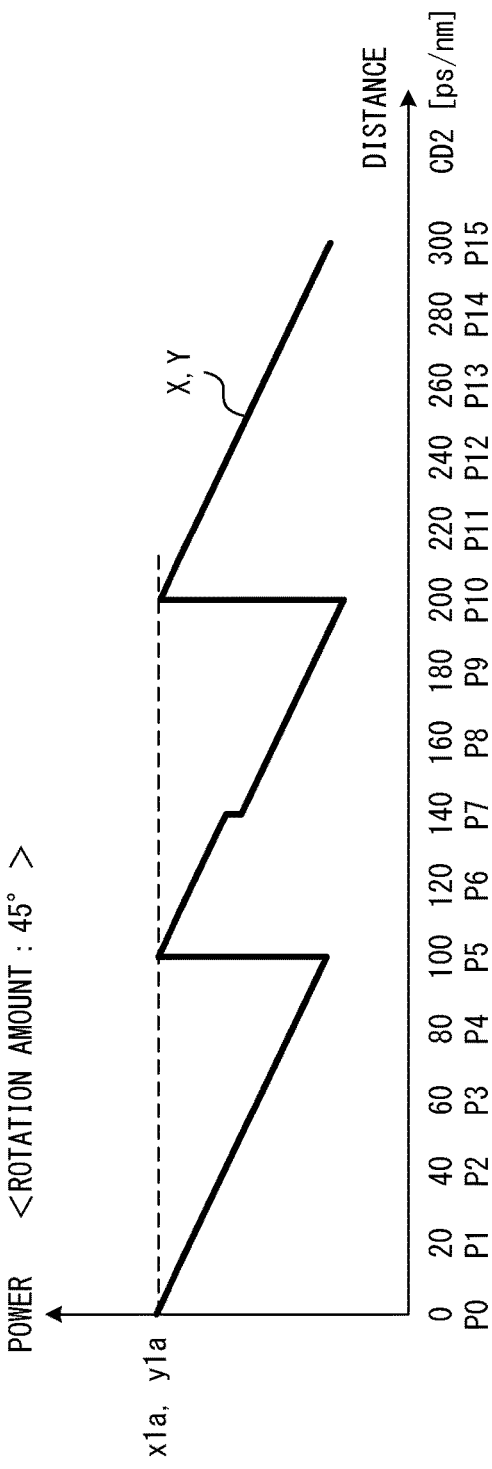

When the polarization rotation amount is "45°," the loss in the X polarization signal is equal to the loss in the Y polarization signal. Thus, as depicted in FIG. 29B, there is no power difference between the X polarization signal and the Y polarization signal.

When the polarization rotation amount is "90°," a loss occurs in the Y polarization signal, but no loss occurs in the X polarization signal. Thus, as depicted in FIG. 30A, there is a power difference between the X polarization signal and the Y polarization signal. However, when the polarization rotation amount is "0°," the optical power of the X polarization signal is smaller than the optical power of the Y polarization signal, and when the polarization rotation amount is "90°," the optical power of the Y polarization signal is smaller than the optical power of the X polarization signal.

The power profile attained when the polarization rotation amount is "135°" is substantially equal to the power profile attained when the polarization rotation amount is "45°." That is, as depicted in FIG. 30B, there is no power difference between the X polarization signal and the Y polarization signal.

With respect to such power profiles, the peak detector 51b detects a peak position for each span. In particular, as described above by referring to FIG. 27, the peak detector 51b detects a peak position for each of the section extending from P0 to P4, the section extending from P4 to P9, and the section extending from P9 to P14. As a result, P0, P5, and P10 are respectively obtained as peak positions for the spans S1, S2, and S3.

As depicted in FIG. 31A, for each peak position, the power difference calculator 51c calculates a power difference for each polarization rotation amount. For example, with respect to the power differences at the peak position P10, "X0a-y0a" is obtained for the polarization rotation amount of "0°," "X1a-y1a" is obtained for the polarization rotation amount of "45°," "X2a-y2a" is obtained for the polarization rotation amount of "90°," and "X3a-y3a" is obtained for the polarization rotation amount of "135°." The same is true for the power differences at the peak positions P0 and P5.

The deciding unit 51d compares each power difference obtained by the power difference calculator 51c with a specified threshold. When a power difference that is greater than the threshold is detected, the deciding unit 51d decides that a polarization dependent loss has occurred on the optical transmission line. In the examples indicated in FIGS. 29A-30B, the difference made at the peak position P0 between the optical power of the X polarization signal and the optical power of the Y polarization signal (i.e., power difference) is almost zero for all of the polarization rotation amounts. Thus, a power difference that is greater than the threshold is not detected at the peak position P0. The same is true for the peak position P5. By contrast, with respect to the peak position P10, as indicated in FIG. 29A, a large power difference of "x0a-y0a" is detected when the polarization rotation amount is "0°." As indicated in FIG. 30A, a large power difference of "X2a-y2a" is also detected when the polarization rotation amount is "90°." Accordingly, the decision result indicated in FIG. 31B is provided.

In addition, the deciding unit 51d detects a position at which a polarization dependent loss has occurred. In particular, the deciding unit 51d decides that a polarization dependent loss has occurred between a target peak position at which a power difference that is greater than the threshold has been detected and a next peak position that is adjacent to the target peak position and located closer to the transmitter node than the target peak position is. In this example, a power difference that is greater than the threshold is detected at the peak position P10. Meanwhile, the peak position "P5" is adjacent to the peak position P10 and located closer to the transmitter node than the peak position P10 is. In this case, it is decided that a polarization dependent loss has occurred in the section between the positions P5 and P10.

Figure 32:
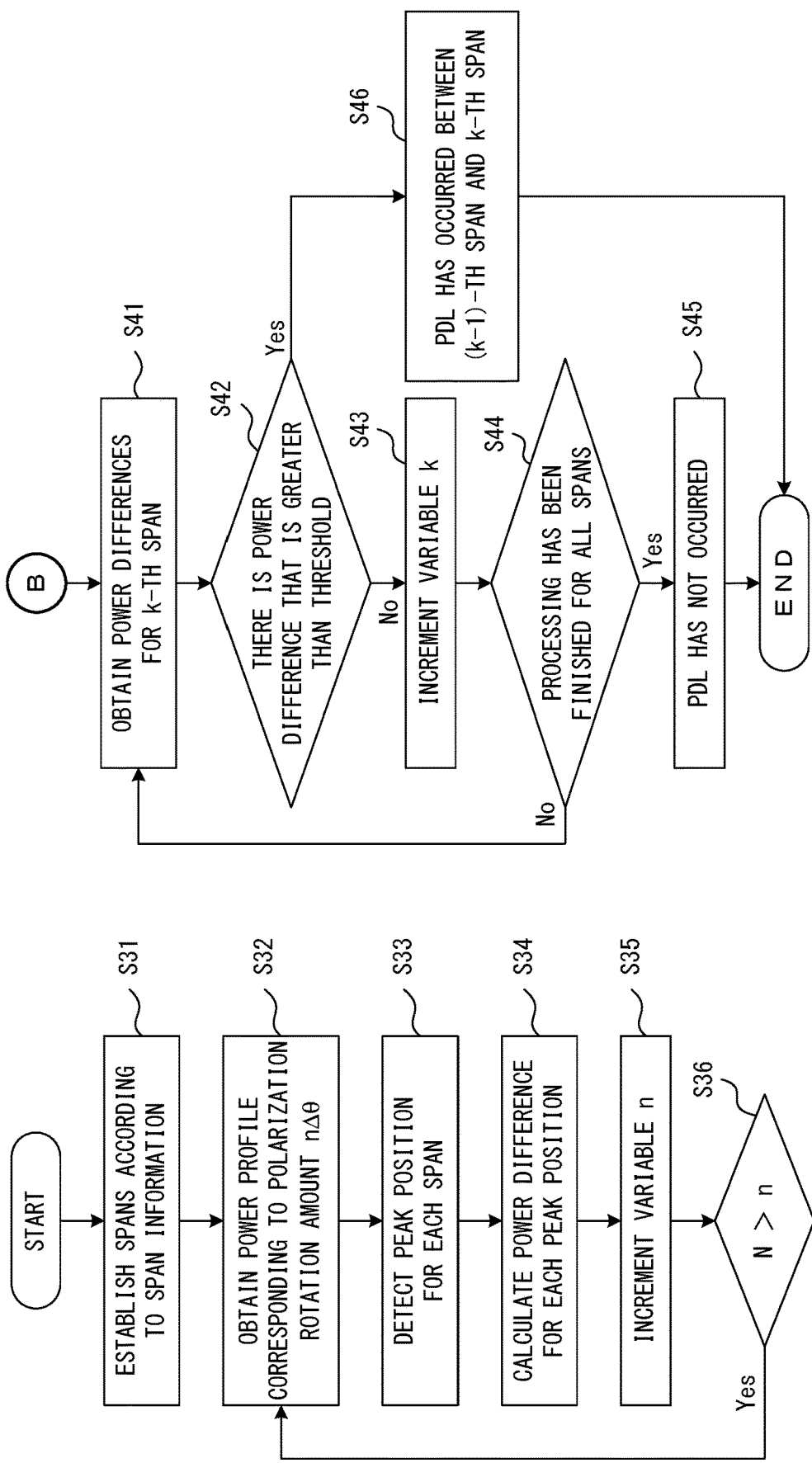
FIG. 32 is a flowchart illustrating an example of a method for detecting a position of occurrence of a polarization dependent loss in a second embodiment.

FIG. 32 is a flowchart illustrating an example of a method for detecting a position of occurrence of a polarization dependent loss in the second embodiment. Assume that before the processes of this flowchart are started, the characteristics detector 27 creates power profiles for each polarization rotation amount.

In S31, the peak detector 51b establishes, according to span information, a plurality of spans on an optical transmission line between a transmitter node and the optical network device 2. In S32, power profiles corresponding to a polarization rotation amount nΔθ are obtained. The variable n designates a polarization rotation amount attained by the monitor signal rotator 24 and the reference signal rotator 25. The variable n is initialized to zero when the flowchart starts. Δθ indicates the step of the polarization rotation amount. In the examples depicted in FIGS. 29A-30B, n is 0, 1, 2, or 3, and Δθ is 45°. In S33, the peak detector 51b detects a peak position for each span. In this case, for example, the peak detector 51b may detect, within a search range established for each span, a measurement position at which maximum optical power is detected.

In S34, the power difference calculator 51c calculates a power difference for each peak position. In particular, the difference between the optical power of a X polarization signal and the optical power of a Y polarization signal is calculated for each peak position.

In S35-S36, the span specification unit 51 increments the variable n. When the variable n is less than a threshold N, the process of the span specification unit 51 returns to S32. The threshold N designates the range of the polarization rotation attained by the monitor signal rotator 24 and the reference signal rotator 25. In the examples indicated in FIGS. 29A-30B, N is 4. When the variable n reaches the threshold N, the process of the span specification unit 51 shifts to S41. That is, for each polarization rotation amount, the span specification unit 51 calculates a power difference for each peak position by repeatedly executing S31-S36.

In S41, the deciding unit 51d obtains power differences corresponding to a k-th span. In particular, power differences detected at a peak position corresponding to the k-th span for the respective polarization rotation amounts are obtained. The variable k designates a span on the optical transmission line. The variable k is initialized to 1 when the flowchart starts. Thus, a span including the transmitter node is selected when the flowchart starts.

In S42, the deciding unit 51d compares each power difference obtained in S41 with a specified PDL threshold. For example, in the case depicted in FIG. 31A, for the span S1, four power differences "x00–y00," "x10–y10," "x20–y20," and "x30–y30" may each be compared with the PDL threshold. When a power difference that is greater than the PDL threshold is not found through the comparison, the deciding unit 51d increments the variable k in S43-S44. When an unprocessed span remains, the process of the deciding unit 51d returns to S41. Thus, the deciding unit 51d selects a next span. In this way, the deciding unit 51d sequentially selects spans one by one in the direction from the transmitter node toward the receiver node so as to perform the corresponding processing, until a power difference that is greater than the PDL threshold is detected. When a power difference that is greater than the PDL threshold is not detected for any of the spans, the deciding unit 51d decides in S45 that a polarization dependent loss has not occurred.

When a power difference that is greater than the PDL threshold is detected in the processing for the k-th span, the deciding unit 51d decides in S46 that a polarization dependent loss has occurred. In addition, the deciding unit 51d detects a position at which the polarization dependent loss has occurred. In particular, information indicating that a polarization dependent loss has occurred in the section between a peak position corresponding to the (k-1)-th span and a peak position corresponding to the k-th span may be output.

As described above, in the second embodiment, it is decided whether a polarization dependent loss has occurred according to the power difference between polarizations detected in a section in which optical power is high. Hence, even in a case where noise is added to an optical signal, it can be accurately decided whether a polarization dependent loss has occurred.

In the examples described above by referring to FIGS. 25-32, a polarization dependent loss is detected using the difference between the optical power of a X polarization signal and the optical power of a Y polarization signal. However, the second embodiment is not limited to this method. In particular, by using either the optical power of a X polarization signal or the optical power of a Y polarization signal, the optical network device 2 in accordance with the second embodiment may detect a position at which a polarization dependent loss has occurred. Alternatively, the optical network device 2 in accordance with the second embodiment may detect a position at which a polarization dependent loss has occurred, according to a polarization component in the θ-axis direction or the orthogonal-axis direction depicted in FIG. 11B.

Raman Amplification

For example, the optical amplifier may be a rare-earth doped fiber amplifier, e.g., erbium doped fiber amplifier (EDFA). However, the optical amplifier provided on an optical transmission line is not particularly limited and may be, for example, a distributed Raman amplifier.

Figure 33A:
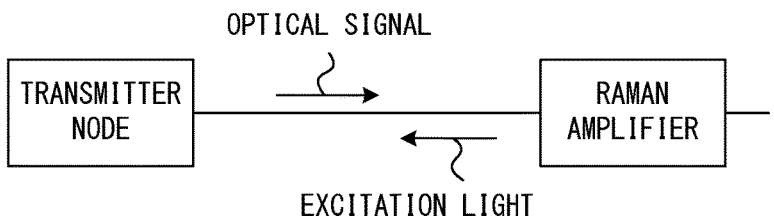
FIGS. 33A-33D are explanatory diagrams for distributed Raman amplification.
Figure 33B:
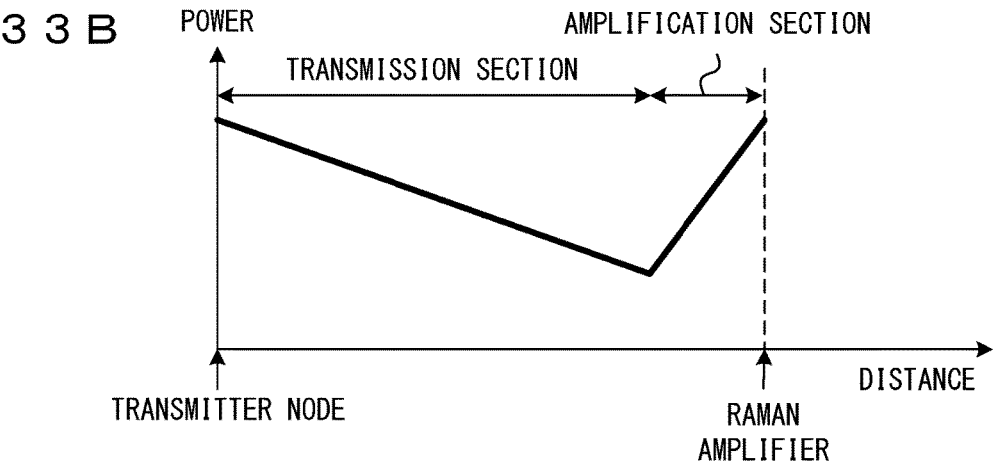
Figure 33C:
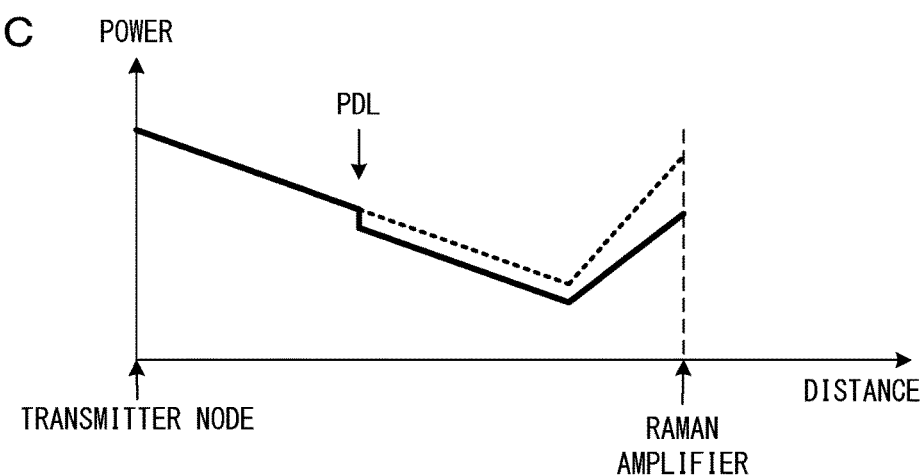
Figure 33D:
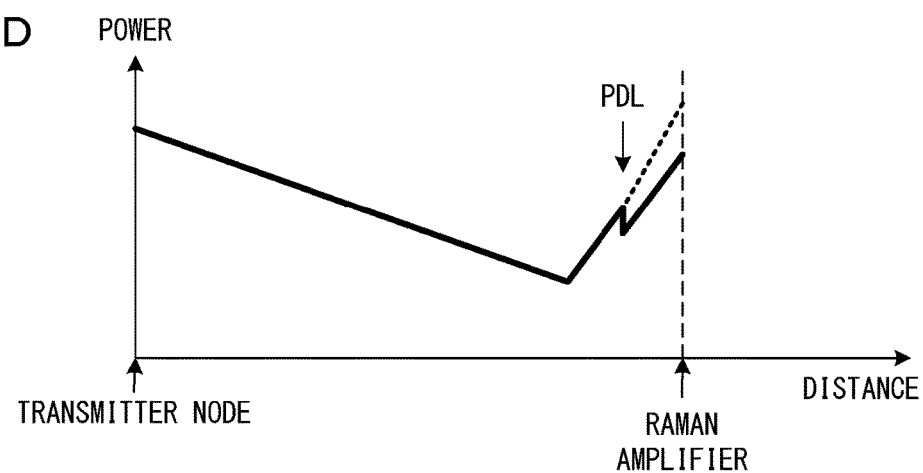

FIGS. 33A-33D are explanatory diagrams for distributed Raman amplification. As depicted in FIG. 33A, a Raman amplifier supplies pump light to a transmission-line optical fiber through which an optical signal propagates. Accordingly, the optical signal is amplified by the energy of the pump light. In many cases, pump light is supplied to an optical transmission line such that the pump light propagates in an opposite direction from an optical signal. In the present case, as depicted in FIG. 33B, the optical signal is amplified in a region close to the Raman amplifier. Thus, a power profile is attained in which the optical power gradually decreases as the distance from a transmitter node increases, and increases in a range at which the pump light arrives. Note that a region in which an optical signal is amplified by pump light may hereinafter be referred to as an "amplification section." Another region in the optical transmission line may hereinafter be referred to as a "transmission section."

When a polarization dependent loss occurs in an optical transmission line on which a Raman amplifier is implemented, a power profile in which the power of an optical signal includes a "step-like portion" is attained. For example, when a polarization dependent loss occurs in the transmission section, the power profile depicted in FIG. 33C may be attained, and when a polarization dependent loss occurs in the amplification section, the power profile depicted in FIG. 33D may be attained. In either case, since there is a power difference between the polarizations, a position at which the polarization dependent loss has occurred can be detected.

Figure 34:
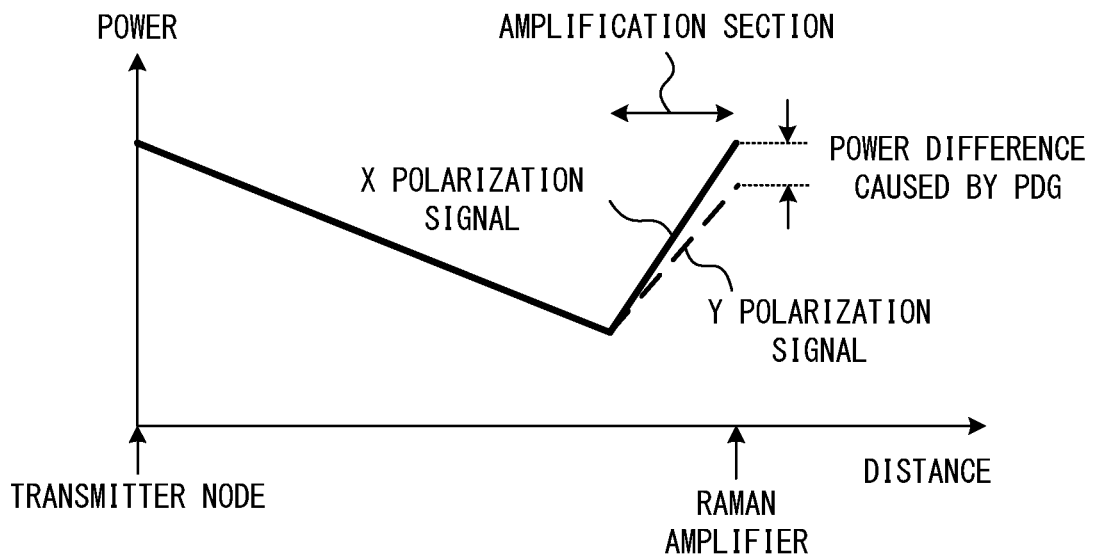
FIG. 34 is an explanatory diagram for a PDG that occurs in distributed Raman amplification.

In the meantime, distributed Raman amplification may cause a PDG in which a gain differs according to the state of a polarization. For example, when distributed Raman amplification causes a PDG while there is no polarization dependent loss, the difference between the optical power of a X polarization signal and the optical power of a Y polarization signal, as depicted in FIG. 34, may gradually increase in the amplification section. Accordingly, when the polarization rotation amount attained by the monitor signal rotator 24 and the reference signal rotator 25 is controlled, the power profiles indicated using a solid line and a dashed line in FIG. 34 are obtained.

The optical network device 1 in accordance with the first embodiment detects a "step-like portion" in a power profile. Thus, the optical network device 1 can detect a polarization dependent loss but has difficulty in detecting a PDG caused by distributed Raman amplification. By contrast, the optical network device 2 in accordance with the second embodiment detects the optical power of each polarization at a peak position at which the optical power reaches a peak. Hence, the optical network device 2 can detect a power difference caused by a PDG. Accordingly, the optical network device 2 can detect a power difference caused by a polarization dependent loss or a PDG.

Meanwhile, the position at which the Raman amplifier is implemented is known. In addition, power profiles obtained for the optical transmission line on which the Raman amplifier is implemented have a characteristic shape, as depicted in FIG. 33B. Hence, it can be decided whether the cause of the power difference is a polarization dependent loss or a PDG based on a power profile that is obtained when a power difference is detected at a peak position.

Figure 35:
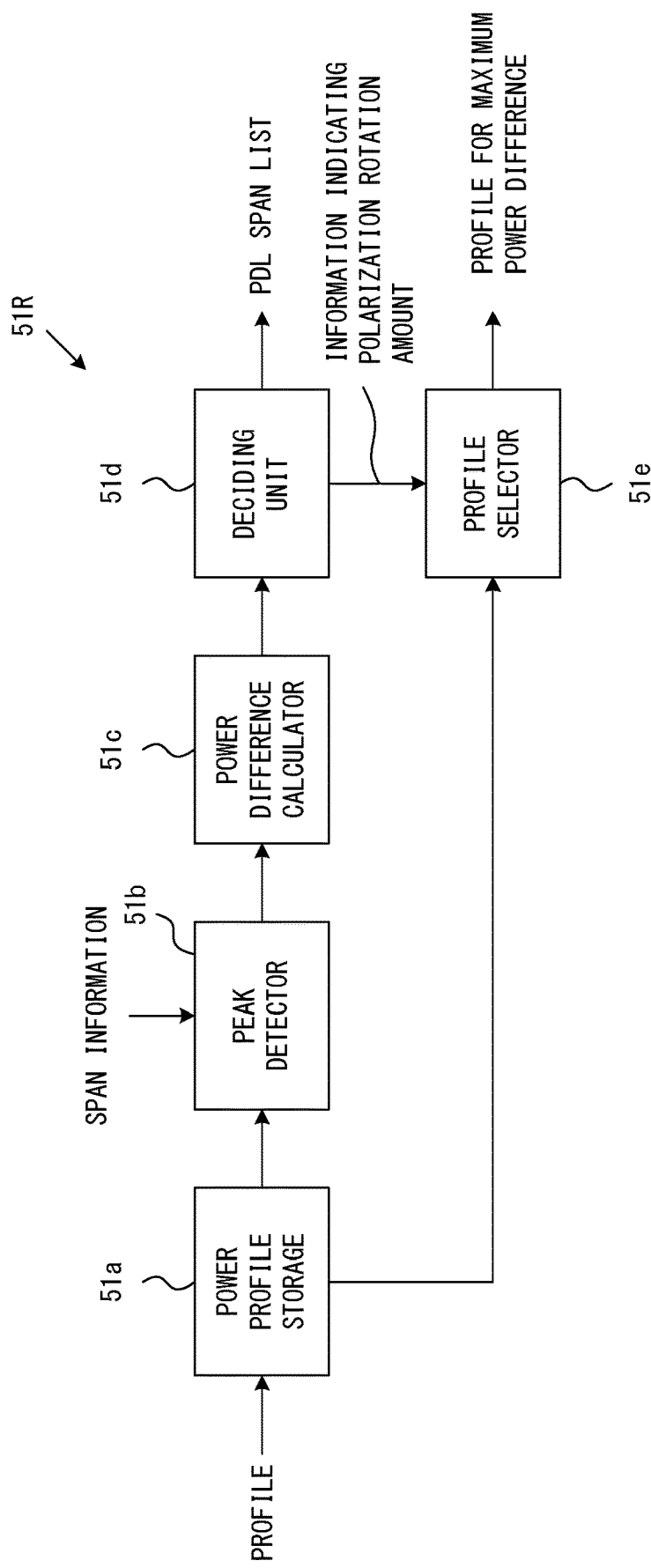
FIG. 35 illustrates an example of a span specification unit that is used in an optical transmission system provided with a Raman amplifier.

FIG. 35 illustrates an example of a span specification unit that is used in an optical transmission system provided with a Raman amplifier. A span specification unit 51R includes a profile selector 51e in addition to the configuration depicted in FIG. 26.

The power profile storage 51a, the peak detector 51b, the power difference calculator 51c, and the deciding unit 51d of the span specification unit 51R depicted in FIG. 35 are substantially the same as those of the span specification unit 51 depicted in FIG. 26. However, when a power difference that is greater than a specified threshold is detected, the deciding unit 51d implemented in the span specification unit 51R outputs information indicating a polarization rotation amount at which the power difference has occurred. For example, in a case where a power difference that is greater than the threshold is detected when the polarization rotation amount attained by the monitor signal rotator 24 and the reference signal rotator 25 is "45°," the deciding unit 51d may output "polarization rotation amount is 45°."

The profile selector 51e selects a corresponding power profile from the power profile storage 51a according to information indicating a polarization rotation amount that is output from the deciding unit 51d. When "polarization rotation amount is 45°" is output from the deciding unit 51d, the profile selector 51e selects a power profile corresponding to "polarization rotation amount is 45°" from the power profile storage 51a and outputs the selected power profile. Accordingly, the network administrator can decide whether the cause of a power difference is a polarization dependent loss or a PDG according to the shape of the power profile selected by the profile selector 51e.

Polarization Rotation

As described above, the optical network devices 1 and 2 in accordance with embodiments of the present invention perform processing for rotating the polarizations of a monitor signal and a reference signal. However, the processing for controlling the polarizations of a signal is not limited to the rotational processing operation. In particular, in addition to the rotational processing operation, the optical network devices 1 and 2 may perform processing for controlling the phase difference between the two polarizations. Specifically, the processing indicated by formula (6), instead of the processing indicated by formula (4), may be performed for a monitor signal. Ex and Ey indicate polarization components of the monitor signal. θ indicates a polarization rotation amount. δ indicates the phase difference between the two polarizations.

$$\left(\begin{pmatrix} Erx \\ Ery \end{pmatrix} = \begin{pmatrix} \cos\theta i & -\sin\theta i \\ \sin\theta i & \cos\theta i \end{pmatrix}\begin{pmatrix} e^{j\delta} & 0 \\ 0 & 1 \end{pmatrix}\begin{pmatrix} Ex \\ Ey \end{pmatrix} = \begin{pmatrix} Ex \cdot e^{j\delta}\cos\theta i - Ey \cdot \sin\theta i \\ Ex \cdot e^{j\delta}\sin\theta i + Ey \cdot \cos\theta i \end{pmatrix}\right) \quad (6)$$

In this case, the processing indicated by formula (7), instead of the processing indicated by formula (5), is performed for the reference signal. Esx and Esy indicate polarization components of the reference signal.

$$\begin{pmatrix} Esrx \\ Esry \end{pmatrix} = \quad (7)$$

$$\begin{pmatrix} \cos\theta i & -\sin\theta i \\ \sin\theta i & \cos\theta i \end{pmatrix}\begin{pmatrix} e^{j\delta} & 0 \\ 0 & 1 \end{pmatrix}\begin{pmatrix} Esx \\ Esy \end{pmatrix} = \begin{pmatrix} Esx \cdot e^{j\delta}\cos\theta i - Esy \cdot \sin\theta i \\ Esx \cdot e^{j\delta}\sin\theta i + Esy \cdot \cos\theta i \end{pmatrix}$$

The optical network devices 1 and 2 create power profiles while controlling the polarization rotation amount θ and the phase difference δ. In this case, the monitor signal rotator 24 controls the polarization rotation amount θ and the phase difference δ of the monitor signal. Thus, the monitor signal rotator 24 is an example of a polarization controller configured to generate a third polarization component and a fourth polarization component orthogonal to each other by controlling a first polarization component and a second polarization components that indicate a monitor signal. The reference signal rotator 25 controls the polarization rotation amount θ and the phase difference δ of the reference signal. Thus, the reference signal rotator 25 is an example of a second polarization controller configured to control a polarization of a reference signal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical network device comprising:
   a receiver configured to receive a polarization multiplexed optical signal transmitted from a transmitter node; and
   a processor configured to
      separate an electric-field-information signal indicating an electric field of the polarization multiplexed optical signal into a first polarization component and a second polarization component orthogonal to each other,
      generate a third polarization component and a fourth polarization component orthogonal to each other by controlling the first polarization component and the second polarization component in a coordinate system indicating a first polarization direction and a second polarization direction orthogonal to each other,
      calculate an evaluation value corresponding to at least either a power of the third polarization component or a power of the fourth polarization component for each of a plurality of positions on an optical transmission line between the transmitter node and the optical network device,
      calculate, for each of the plurality of positions, a variation in the evaluation value that is associated with a control amount in the controlling, and
      decide whether a first position among the plurality of positions is a position to be detected based on a result of comparing a variation in an evaluation value calculated for the first position with a variation in an evaluation value calculated for a second position adjacent to the first position among the plurality of positions.

2. The optical network device according to claim 1, wherein
the processor generates the third polarization component and the fourth polarization component by rotating the first polarization component and the second polarization component in the coordinate system, and
the processor calculates, for each of the plurality of positions, a variation in the evaluation value that is associated with a rotation amount in the rotating.

3. The optical network device according to claim 1, wherein
the second position is adjacent to, and located on a transmitter-node side of, the first position, and
the processor decides that the first position is a position to be detected when the variation in the evaluation value calculated for the first position is larger than the variation in the evaluation value calculated for the second position.

4. The optical network device according to claim 1, wherein
the variation in the evaluation value is a difference between a maximum value and a minimum value of the evaluation value obtained when the first polarization component and the second polarization component are rotated in the coordinate system.

5. The optical network device according to claim 1, wherein
the processor outputs information indicating the first position when a difference between the variation in the evaluation value calculated for the first position and the variation in the evaluation value calculated for the second position is larger than a specified threshold.

6. The optical network device according to claim 1, wherein
the processor
compensates for a first chromatic dispersion in a chromatic dispersion of the transmission line in the electric-field-information signal so as to generate a first compensated signal,
compensates for a nonlinear distortion of the transmission line in the first compensated signal so as to generate a second compensated signal,
compensates for a remaining chromatic dispersion in the chromatic dispersion of the transmission line in the second compensated signal so as to generate a third compensated signal,
calculates an evaluation value corresponding to a combination of the first chromatic dispersion and the remaining chromatic dispersion based on the third compensated signal, and
calculates evaluation values for the plurality of positions on the transmission line by calculating the evaluation values while changing an amount of the first chromatic dispersion.

7. The optical network device according to claim 6, wherein
the evaluation value indicates a correlation between a reference signal indicating the electric field of the polarization multiplexed optical signal in the transmitter node and the third compensated signal.

8. The optical network device according to claim 7, wherein
the processor controls a polarization of the reference signal in the coordinate system by a control amount for generating the third polarization component and the fourth polarization component from the first polarization component and the second polarization component, and
the evaluation value indicates a correlation between a reference signal on which the polarization is controlled and the third compensated signal.

9. The optical network device according to claim 1, wherein
the processor performs, in parallel, a plurality of rotational processing operations for rotating the first polarization component and the second polarization component by different rotation amounts in the coordinate system, and
the processor calculates evaluation values corresponding to results of the plurality of rotational processing operations.

10. The optical network device according to claim 1, wherein
the receiver is a coherent receiver that generates an electric-field-information signal indicating the electric field of the polarization multiplexed optical signal,
the processor
generates a second electric-field-information signal for which chromatic dispersion of the optical transmission line has been compensated for, by correcting the electric-field-information signal generated by the coherent receiver,
extracts the first polarization component and the second polarization component from the second electric-field-information signal, and
recovers transmission data based on the first polarization component and the second polarization component.

11. The optical network device according to claim 1, wherein
the receiver is a coherent receiver that generates an electric-field-information signal indicating the electric field of the polarization multiplexed optical signal,
the processor
generates a second electric-field-information signal for which chromatic dispersion of the optical transmission line has been compensated for, by correcting the electric-field-information signal generated by the coherent receiver,
extracts the first polarization component and the second polarization component from the second electric-field-information signal, and
generates a third electric-field-information signal for which residual dispersion has been compensated for, by adaptively correcting the second electric-field-information signal, and
recovers transmission data based on the third electric-field-information signal.

12. The optical network device according to claim 1, wherein
the receiver is a coherent receiver that generates an electric-field-information signal indicating the electric field of the polarization multiplexed optical signal,
the processor
extracts the first polarization component and the second polarization component from the electric-field-information signal generated by the coherent receiver,
generates a second electric-field-information signal for which chromatic dispersion of the optical transmission line has been compensated for, by correcting the electric-field-information signal generated by the coherent receiver, generates a third electric-field-information signal for which residual dispersion has been compensated for, by adaptively correcting the second electric-field-information signal, and recovers transmission data based on the third electric-field-information signal.

13. The optical network device according to claim 1, wherein the processor detects, based on the evaluation value calculated for each of the plurality of positions on the optical transmission line, a peak position at which at least either the power of the third polarization component or the power of the fourth polarization component reaches a peak, and the processor decides whether a section between a first peak position among a plurality of detected peak positions and a second peak position adjacent to the first peak position among the plurality of detected peak positions is a section to be detected, based on a result of comparing a variation in an evaluation value calculated for the first peak position with a variation in an evaluation value calculated for the second peak position.

14. The optical network device according to claim 13, wherein when the variation in the evaluation value calculated for the first peak position is greater than a specified value, the processor specifies a first control amount that makes a difference between the power of the third polarization component and the power of the fourth polarization component greater than a specified value, the first control amount being an amount of control performed on the first polarization component and the second polarization component, and the processor outputs an evaluation value corresponding to the first control amount for each of the plurality of positions.

15. A transmission-line monitoring method for monitoring an optical transmission line between a transmitter node and an optical network device that receives a polarization multiplexed optical signal transmitted from the transmitter node, the transmission-line monitoring method comprising:

separating an electric-field-information signal indicating an electric field of the polarization multiplexed optical signal into a first polarization component and a second polarization component orthogonal to each other;

generating a third polarization component and a fourth polarization component orthogonal to each other by rotating the first polarization component and the second polarization component in a coordinate system indicating a first polarization direction and a second polarization direction orthogonal to each other;

calculating an evaluation value corresponding to at least either a power of the third polarization component or a power of the fourth polarization component for each of a plurality of positions on the optical transmission line;

calculating, for each of the plurality of positions, a variation in the evaluation value that is associated with a rotation amount; and deciding whether a first position among the plurality of positions is a position to be detected based on a result of comparing a variation in an evaluation value calculated for the first position with a variation in an evaluation value calculated for a second position adjacent to the first position among the plurality of positions.

16. A transmission-line monitoring method for monitoring an optical transmission line between a transmitter node and an optical network device that receives a polarization multiplexed optical signal transmitted from the transmitter node, the transmission-line monitoring method comprising:

separating an electric-field-information signal indicating an electric field of the polarization multiplexed optical signal into a first polarization component and a second polarization component orthogonal to each other;

generating a third polarization component and a fourth polarization component orthogonal to each other by performing a rotational processing operation for the first polarization component and the second polarization component in a coordinate system indicating a first polarization direction and a second polarization direction orthogonal to each other;

deciding, for each of a plurality of positions on the optical transmission line, whether a difference between a power of the third polarization component and a power of the fourth polarization component is greater than a specified threshold when a rotation amount of the rotational processing operation is changed within a specified range; and when the difference obtained for a first position among the plurality of positions is greater than the threshold, deciding whether the first position is a position to be detected, based on a result of comparing the difference obtained for the first position with the difference obtained for a second position adjacent to the first position among the plurality of positions.

* * * * *